US010541777B2

(12) United States Patent
Michael

(10) Patent No.: US 10,541,777 B2
(45) Date of Patent: Jan. 21, 2020

(54) DATA PROCESSING DEVICE, DATA PROCESSING METHOD, AND PROGRAM

(71) Applicant: Saturn Licensing LLC, New York, NY (US)

(72) Inventor: Lachlan Bruce Michael, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/364,150

(22) PCT Filed: Oct. 7, 2013

(86) PCT No.: PCT/JP2013/077226
§ 371 (c)(1),
(2) Date: Jun. 10, 2014

(87) PCT Pub. No.: WO2014/061487
PCT Pub. Date: Apr. 24, 2014

(65) Prior Publication Data
US 2014/0314103 A1    Oct. 23, 2014

(30) Foreign Application Priority Data
Oct. 17, 2012    (JP) ................. 2012-229550

(51) Int. Cl.
*H04L 29/06*    (2006.01)
*H04L 1/00*    (2006.01)

(52) U.S. Cl.
CPC ................. *H04L 1/0007* (2013.01)

(58) Field of Classification Search
CPC ............ H04N 21/4382; H04N 21/643; H04N 21/64707
See application file for complete search history.

(56) References Cited

U.S. PATENT DOCUMENTS 6,765,931 B1 *  7/2004  Rabenko ............. H04B 3/23
                                                  348/E7.049
2006/0007953 A1 *  1/2006  Vesma .............. H04L 1/0057
                                                  370/466
(Continued)

FOREIGN PATENT DOCUMENTS

CN    101217535 A    7/2008
CN    101971533 A    2/2011
(Continued)

OTHER PUBLICATIONS

ETSI TS 102 606 V1 .1.1 (Oct. 2007).*
(Continued)

*Primary Examiner* — Khaled M Kassim
*Assistant Examiner* — Berhanu D Belete
(74) *Attorney, Agent, or Firm* — Lerner, David, Littenberg, Krumholz & Mentlik, LLP

(57) ABSTRACT

The present technology relates to a data processing device, a data processing method, and a program capable of realizing low cost of a reception device receiving a GSE packet conforming to DVB-GSE. An sGSE packet structuring unit sets, as a target, only a PDU (Protocol Data Unit) of which a maximum size is restricted to a predetermined restriction size equal to or less than 4096 bytes and structures an sGSE packet which is a GSE packet in which the PDU is deployed in a data field and which conforms to DVB (Digital Video Broadcasting)-GSE (Generic Stream Encapsulation). The present technology is applicable, for example, when the GSE packet is transmitted or received.

10 Claims, 23 Drawing Sheets

(56) References Cited

U.S. PATENT DOCUMENTS

| | | | |
|---|---|---|---|
| 2006/0029065 A1* | 2/2006 | Fellman | H04L 1/004 370/389 |
| 2006/0075321 A1* | 4/2006 | Vedantham | H03M 13/1102 714/776 |
| 2007/0186133 A1* | 8/2007 | Stare | H04L 1/0041 714/746 |
| 2008/0225892 A1* | 9/2008 | Vare | H04L 1/0083 370/473 |
| 2009/0079878 A1* | 3/2009 | Lee | H04L 1/0045 348/724 |
| 2009/0080507 A1 | 3/2009 | Lee et al. | |
| 2009/0190677 A1 | 7/2009 | Jokela et al. | |
| 2009/0196252 A1* | 8/2009 | Fischer | H04L 1/0031 370/331 |
| 2009/0203326 A1* | 8/2009 | Vesma | H04H 20/426 455/69 |
| 2009/0260042 A1* | 10/2009 | Chiang | 725/80 |
| 2009/0307727 A1 | 12/2009 | Thesling | |
| 2010/0034219 A1* | 2/2010 | Stadelmeier | H04N 21/4385 370/478 |
| 2011/0044393 A1* | 2/2011 | Ko | H04L 5/0007 375/260 |
| 2011/0051745 A1* | 3/2011 | Lee | H04N 21/238 370/474 |
| 2011/0103300 A1 | 5/2011 | Vare et al. | |
| 2011/0211460 A1 | 9/2011 | Beeler | |
| 2012/0327955 A1* | 12/2012 | Herrmann | H04N 21/235 370/476 |
| 2012/0331508 A1 | 12/2012 | Vare et al. | |
| 2013/0034032 A1 | 2/2013 | Vare et al. | |
| 2013/0039278 A1* | 2/2013 | Bouazizi | H04L 65/4076 370/328 |
| 2013/0219431 A1* | 8/2013 | Hong | H04H 20/42 725/54 |
| 2013/0291027 A1* | 10/2013 | Hwang | H04N 21/6131 725/62 |
| 2013/0308505 A1* | 11/2013 | Hong | H04B 7/0413 370/310 |
| 2014/0064280 A1* | 3/2014 | Qin | H04B 7/18582 370/392 |
| 2014/0314103 A1 | 10/2014 | Michael | |
| 2017/0134469 A1 | 5/2017 | Michael | |

FOREIGN PATENT DOCUMENTS

| | | |
|---|---|---|
| CN | 102340453 A | 2/2012 |
| KR | 20100034210 A | 4/2010 |
| WO | 2008-110913 A1 | 9/2008 |

OTHER PUBLICATIONS

ETSI EN 302 755 V1.1.1 (Sep. 2009).*
ETSI TS 102 771 V1.1.1, European Broadcasting Union, Jun. 30, 2009, pp. 1 to 34, [online], [retrieval date Dec. 4, 2013 (Dec. 4, 2013)], Internet <URL:http://www.etsi.org/deliver/etsi_ts/102700_102799/102771/01.01.01_60/ts_102771v010101p.pdf>.
International Search Report from International Publication PCT/JP2013/077226 dated Dec. 17, 2013.
Extended European Search Report for EP Application No. 13846817.8, dated Aug. 28, 2015.
Extended European Search Report for EP Application No. 13847354.1, dated Jul. 22, 2015.
Michael Lachlan, Proposal of GSE-lite, Dec. 10, 2012.
Michael Lachlan, GSE-Lite Proposal, Jan. 29, 2013.
ETSI_DVB—Digital Video Broadcast, Grand Saconnex, Geneva, Oct. 2013.
Wenger, S., H.264/AVC Over IP, IEEE Transactions on Circuits and Systems for Video Technology, vol. 13, No. 7, 2003, pp. 645-656.
Communication pursuant to Article 94(3) ERC for EP Application No. 13847354.1, dated Feb. 19, 2016.
ETSI_DVB—Digital Video Broadcast, Sophia Antipolis Cedex, France, May 2011.
Extended European Search Report for Application No. EP17164726.6, dated Oct. 23, 2017.
Chinese Office Action and Search Report for Application No. CN201380005140.1 dated Jun. 30, 2017.

* cited by examiner

FIG. 7

| | Preamble | Start of frame delimiter | MAC destination | MAC source | Ethertype (Ethernet II) or length (IEEE 802.3) | 802.1Q tag (optional) | Payload | Frame check sequence (32-bit CRC) | Interframe gap |
|---|---|---|---|---|---|---|---|---|---|
| 802.3 Ethernet frame structure | 7 BYTES | 1 BYTE | 6 BYTES | 6 BYTES | 2 BYTES | (4 BYTES) | 42 TO 1500 BYTES | 4 BYTES | 12 BYTES |

DATA PROCESSING DEVICE, DATA PROCESSING METHOD, AND PROGRAM

CROSS-REFERENCE TO RELATED APPLICATION

The present application is a national phase entry under 35 U.S.C. § 371 of International Application No. PCT/JP2013/077226 filed Oct. 7, 2013, published on Apr. 24, 2014 as WO 2014/061487 A1, which claims priority from Japanese Patent Application No. JP 2012-229550 filed in the Japanese Patent Office on Oct. 17, 2012.

TECHNICAL FIELD

The present invention relates to a data processing device, a data processing method, and a program, and more particularly, to a data processing device, a data processing method, and a program capable of reducing cost of a reception device receiving a GSE packet in conformity with, for example, DVB (Digital Video Broadcasting)-GSE (Generic Stream Encapsulation).

BACKGROUND ART

The DVB-GSE defines, for example, a protocol of the data link layer which transmits an IP packet or a PDU (Protocol Data Unit) such as a so-called Ethernet frame (MAC (Media Access Control) frame (where Ethernet is a registered trademark)) defined in IEEE (Institute of Electrical and Electronic Engineers) 802.3 (for example, see Non Patent Literature 1).

In the DVB-GSE, the PDU is encapsulated by a packet called one GSE packet or a plurality of GSE packets, as necessary, and is transmitted.

CITATION LIST

Non Patent Literature

Non Patent Literature 1: ETSI TS 102 606 V1.1.1 (2007-10)

SUMMARY OF INVENTION

Technical Problem

The DVB-GSE is a general standard, in other words, a standard of a less restricted specification so that the DVB-GSE can be used for various use cases.

For this reason, a reception device receiving and processing a GSE packet in conformity with the DVB-GSE has to cope with various use cases. Accordingly, verification of the reception device takes a lot of time, and thus expensive and sophisticated components are necessary in the configuration of the reception device.

For the reception device receiving a GSE packet, as described above, cost is large in terms of time and price and it is difficult to realize low cost.

The present technology is devised in view of the above-mentioned circumstance and can realize low cost of a reception device receiving a GSE packet.

Solution to Problem

According to a first aspect of the present technology, there is provided a data processing device including a packet structuring unit that sets, as a target, only a PDU (Protocol Data Unit) of which a maximum size is restricted to a predetermined restriction size equal to or less than 4096 bytes and structures an sGSE packet which is a GSE packet in which the PDU is deployed in a data field and which conforms to DVB (Digital Video Broadcasting)-GSE (Generic Stream Encapsulation), there is provided a program causing a computer to function as the data processing device.

According to the first aspect of the present technology, there is provided a data processing method including setting, as a target, only a PDU (Protocol Data Unit) of which a maximum size is restricted to a predetermined restriction size equal to or less than 4096 bytes and structuring an sGSE packet which is a GSE packet in which the PDU is deployed in a data field and which conforms to DVB (Digital Video Broadcasting)-GSE (Generic Stream Encapsulation).

According to the above-described first aspect, only a PDU (Protocol Data Unit) of which a maximum size is restricted to a predetermined restriction size equal to or less than 4096 bytes is set as a target, and an sGSE packet is structured which is a GSE packet in which the PDU is deployed in a data field and which conforms to DVB (Digital Video Broadcasting)-GSE (Generic Stream Encapsulation).

According to a second aspect of the present technology, there is provided a data processing device including: a reception unit that receives an sGSE packet which is a GSE packet which is structured by setting, as a target, only a PDU (Protocol Data Unit) of which a maximum size is restricted to a predetermined restriction size equal to or less than 4096 bytes, in which the PDU is deployed in a data field, and which conforms to DVB (Digital Video Broadcasting)-GSE (Generic Stream Encapsulation) and receives sGSE signaling which is signaling used to identify a fact that data is the sGSE packet in a layer equal to or lower than a data link layer of an OSI (Open Systems Interconnection) reference model; a PDU extraction unit that extracts the PDU from the sGSE packet; and an output unit that outputs the PDU extracted from the sGSE packet when the sGSE signaling indicates that the data is the sGSE packet, and there is provided a program causing a computer to function as the data processing device.

According to the second aspect of the present technology, there is provided a data processing method including: a reception step of receiving an sGSE packet which is a GSE packet which is structured by setting, as a target, only a PDU (Protocol Data Unit) of which a maximum size is restricted to a predetermined restriction size equal to or less than 4096 bytes, in which the PDU is deployed in a data field, and which conforms to DVB (Digital Video Broadcasting)-GSE (Generic Stream Encapsulation) and receiving sGSE signaling which is signaling used to identify a fact that data is the sGSE packet in a layer equal to or lower than a data link layer of an OSI (Open Systems Interconnection) reference model; an extraction step of extracting the PDU from the sGSE packet; and an output step of outputting the PDU extracted from the sGSE packet when the sGSE signaling indicates that the data is the sGSE packet.

According to the above-described second aspect, an sGSE packet is received which is a GSE packet which is structured by setting, as a target, only a PDU (Protocol Data Unit) of which a maximum size is restricted to a predetermined restriction size equal to or less than 4096 bytes, in which the PDU is deployed in a data field, and which conforms to DVB (Digital Video Broadcasting)-GSE (Generic Stream Encapsulation), and sGSE signaling is received which is signaling used to identify a fact that data is the sGSE packet in a layer equal to or lower than a data link layer of an OSI (Open Systems Interconnection) reference model. The PDU is extracted from the sGSE packet. The PDU extracted from the sGSE packet is output when the sGSE signaling indicates that the data is the sGSE packet.

The data processing device may be an independent device or may be an internal block included in one device.

The program can be provided by transmitting the program via a transmission medium or recording the program on a recording medium.

Advantageous Effects

According to the first and second aspects of the present technology, it is possible to realize low cost of the reception device receiving a GSE packet.

BRIEF DESCRIPTION OF DRAWINGS

FIG. 7 is a diagram illustrating the frame structure of an Ethernet frame.

DESCRIPTION OF EMBODIMENTS

First, the present DVB-GSE will be described in brief in a preparation for description of the present technology.
<DVB-GSE>

Figure 1:
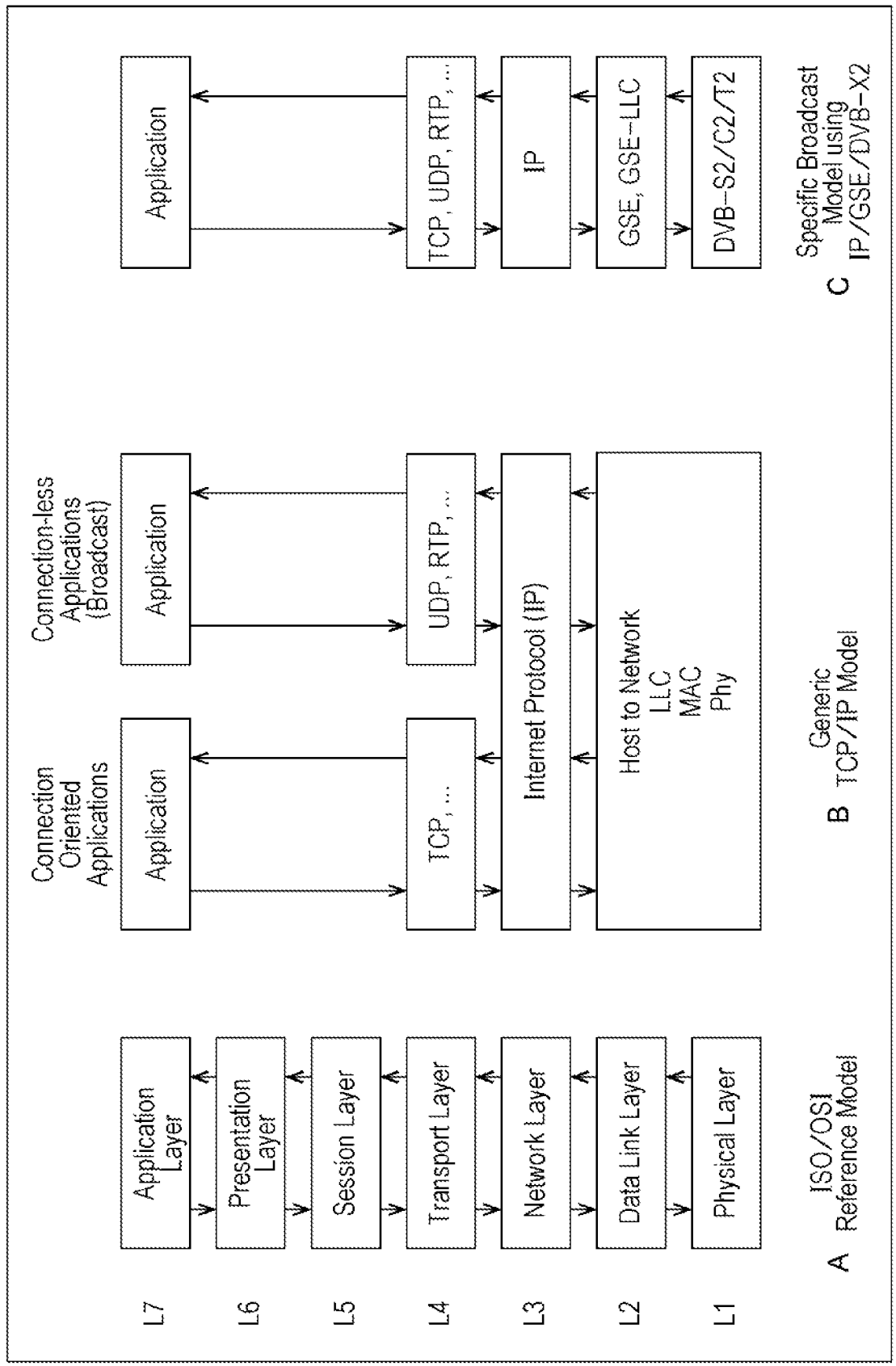
FIG. 1 is a diagram illustrating a relation between the OSI reference model and data transmission of DVB-GSE.

FIG. 1 is a diagram illustrating a relation between the OSI (Open Systems Interconnection) reference model and data transmission (data transmission using DVB-GSE) in DVB-GSE.

A of FIG. 1 shows the OSI reference model (ISO/OSI Reference Model).

The OSI reference model has a physical layer as a first layer, a data link layer as a second layer, a network layer as a third layer, a transport layer as a fourth layer, a session layer as a fifth layer, a presentation layer as a sixth layer, and an application layer as a seventh layer from the lower-order layer to the high-order layer.

B of FIG. 1 shows an example of a protocol stack of data transmission (data transmission using the TCP/IP or the like) of the TCP/IP model (Generic TCP/IP Model).

In the data transmission of the TCP/IP model, the TCP (Transmission Control Protocol) or the like is used for the transport layer in connection-type data transmission (Connection Oriented Applications).

In the data transmission of the TCP/IP model, for example, the UDP (User Datagram Protocol), the RTP (Real-time Transport Protocol), or the like is used for the transport layer in connectionless-type data transmission (Connection-less Applications) such as broadcast.

In the data transmission of the TCP/IP model, the IP (Internet Protocol) is used for the network layer and a host (Host to Network) connected to a network is used for the data link layer and the physical layer in either the connection-type or the connectionless-type data transmission.

The host executes protocols or services of the MAC (Media Access Control) layer and the LLC (Logical Link Control) layer, which are sub-layers constituting the data link layer, and the physical layer (Phy).

C of FIG. 1 shows a protocol stack of data transmission in the DVB-GSE, i.e., for example, an example of a protocol stack of data transmission of a broadcast model (Specific Broadcast Model using IP/GSE/DVB-X2) using an IP, a GSE, and a DVB-X2.

Here, the DVB-X2 indicates a broadcast standard of so-called second-generation broadcast standard of the DVB. Examples of the broadcast standard include a DVB-T2, a DVB-C2, and a DVB-S2.

In the data transmission of the DVB-GSE, the TCP, the UDP, the RTP, or the like are used for the transport layer and the IP (Internet Protocol) is used for the network layer.

In the data transmission of the DVB-GSE, a DVB-GSE or a GSE-LLC is used for the data link layer and a DVB-T2, a DVB-C2, or a DVB-S2 is used for the physical layer.

Figure 2:
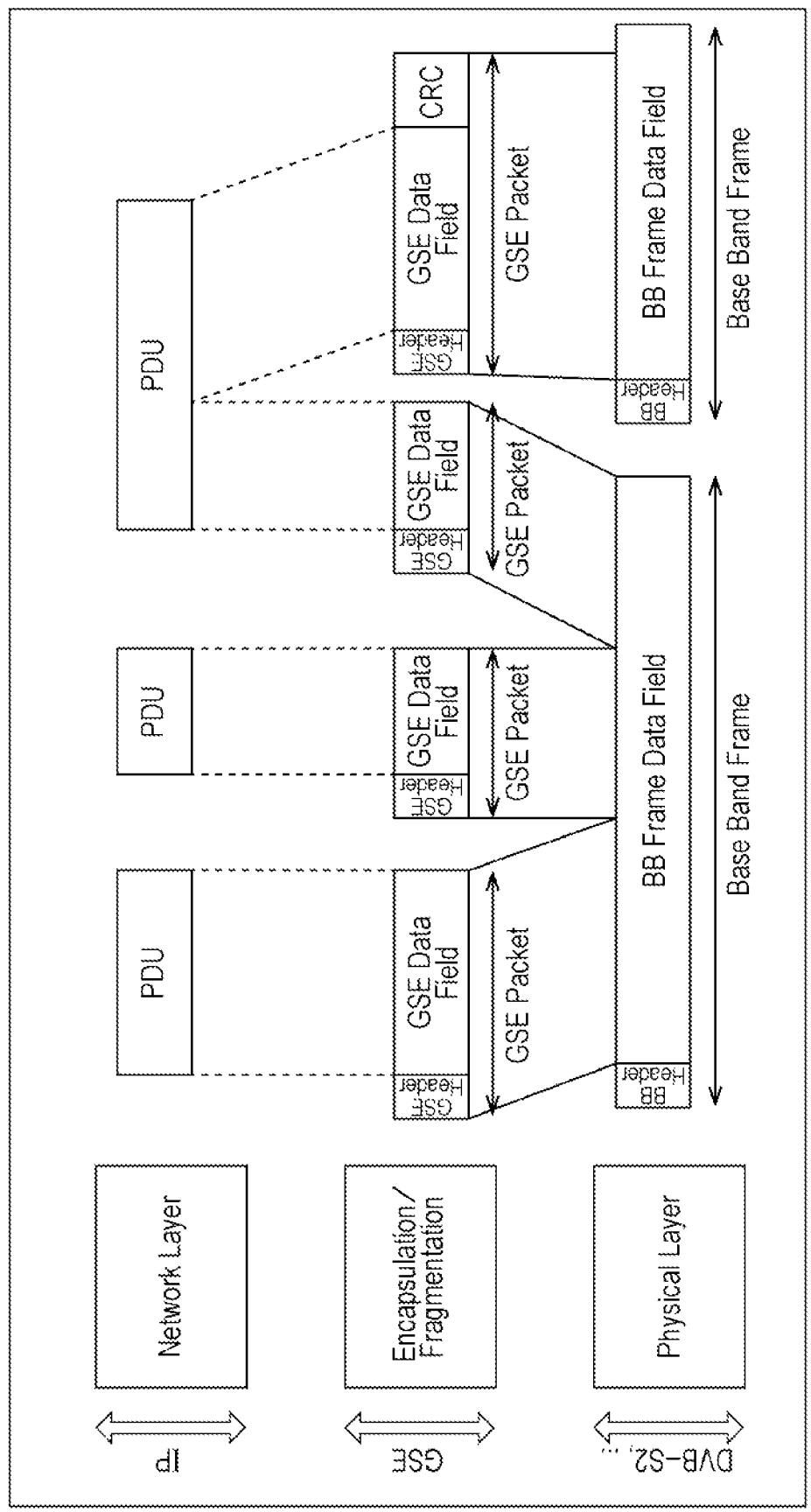
FIG. 2 is a diagram for describing a data transmission process in the DVB-GSE.

FIG. 2 is a diagram for describing a data transmission process in the DVB-GSE described in the specification (Non Patent Literature 1) of the DVB-GSE.

In the DVB-GSE, a PDU of a packet of the network layer such as an IP packet or a frame of the data link layer such as an Ethernet frame is encapsulated in one GSE packet or a plurality of GSE packets, as necessary.

That is, for example, the PDU is deployed in the data field (GSE Data Field) and a GSE header is added (deployed) without change to be encapsulated in one GSE packet.

Alternatively, for example, the PDU is sliced into of the plurality of PDU fragments. Then, each of the fragments is encapsulated in a GSE packet, as described above, so that the PDU is encapsulated in the plurality of GSE packets which is the same as the number of PDU fragments.

When the PDU is encapsulated in the plurality of GSE packets, a CRC (Cyclic Redundancy Check) code used to verify the PDU at the time of reassembly of the (original) PDU from the plurality of PDU fragments is deployed in addition to the final PDU fragment to a data field of the GSE packet in which the final PDU fragment is deployed.

The encapsulation of the PDU in the GSE packets is a process of the data link layer. Thereafter, the GSE packets are transmitted to the physical layer of the DVB-S2 or the like.

That is, in the physical layer, for example, one GSE packet or the plurality of GSE packets are deployed in the data field (BB Frame Data Field), and a BBF (Base Band Frame) to which a BB (Base Band) header is added is structured and, for example, is transmitted with the DVB-X2 (in conformity with the DVB-X2).

Figure 3:
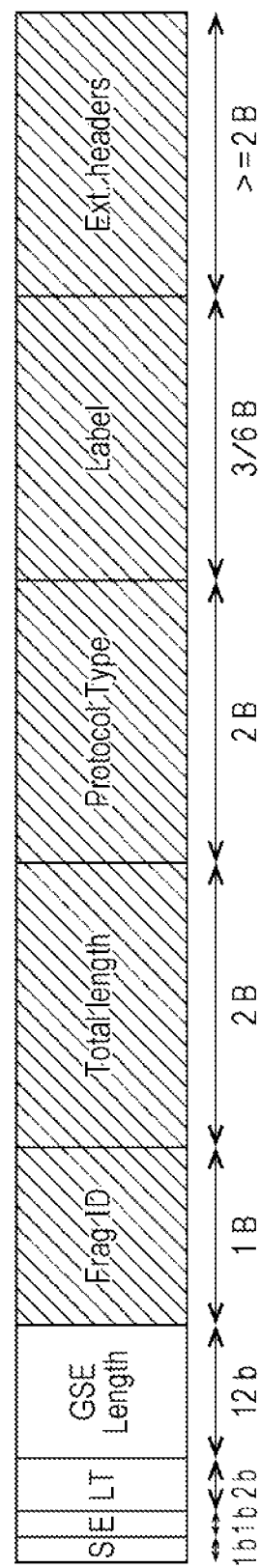
FIG. 3 is a diagram illustrating the format of a GSE header of a GSE packet.

FIG. 3 is a diagram illustrating the format of a GSE header of a GSE packet.

The GSE header has a structure in which a 1-bit (b) start indicator S, a 1-bit end indicator E, a 2-bit LT (Label Type), a 12-bit GSE length (GSE Length), a 1-byte (B) flag ID (Frag ID), a 2-byte total length (Total length), a 2-byte protocol type (Protocol Type), a 3-byte or 6-byte label (Label), and a 2-byte or less extension header (Ext. headers) are arranged side by side in this order.

The flag ID, the total length, the protocol type, the label, and the extension header indicated by diagonal lines in FIG. 3 are optional fields and the essential fields of the GSE header are the start indicator S, the end indicator E, and the LT.

Since the start indicator S, the end indicator E, the LT, the flag ID, the total length, the protocol type, the label, and the extension header are defined in the specification of the DVB-GSE, the description thereof will be omitted.

Figure 4:
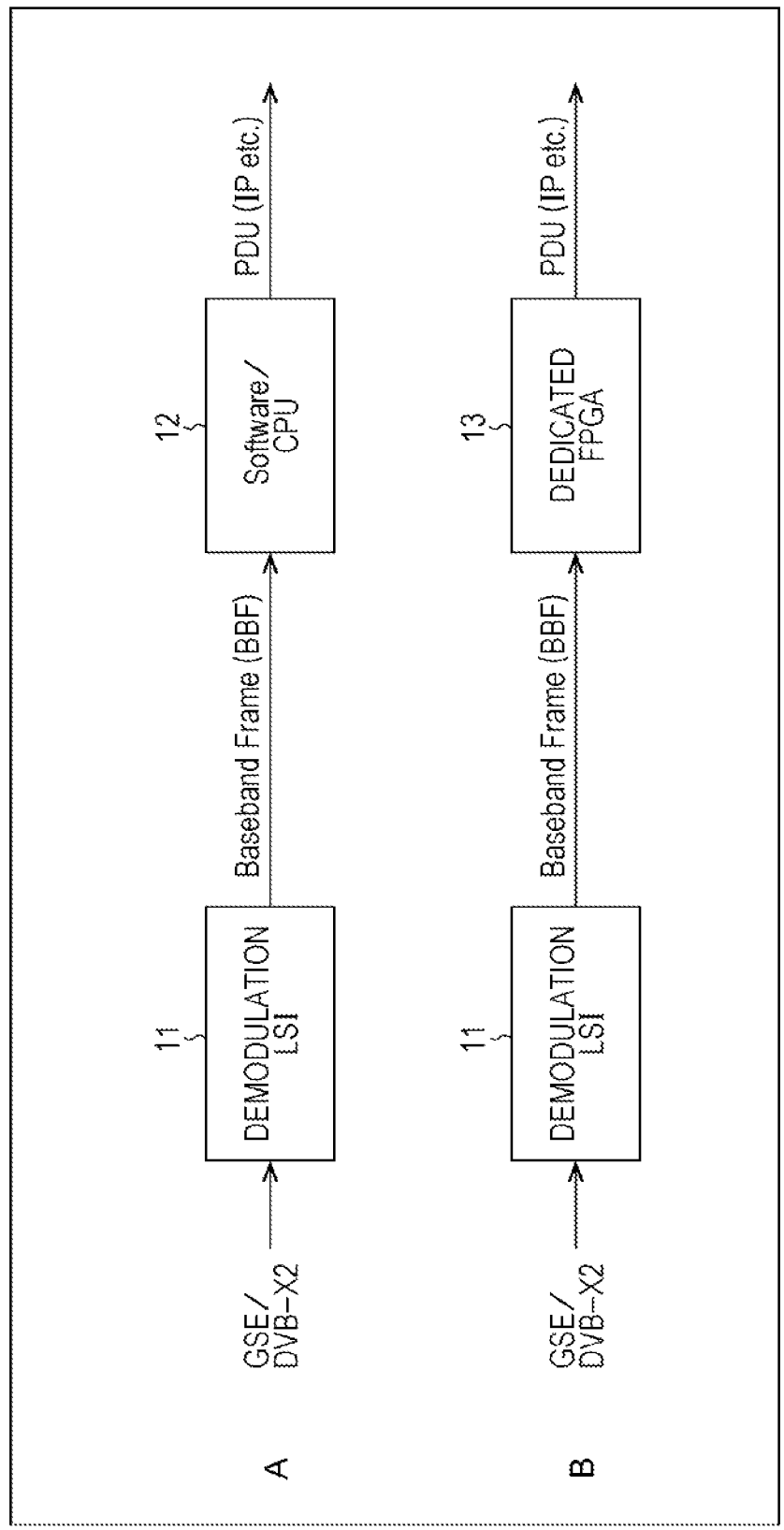
FIG. 4 is a block diagram illustrating examples of the configurations of reception devices receiving a GSE packet transmitted with a DVB-X2.

FIG. 4 is a block diagram illustrating examples of the configurations of reception devices receiving a GSE packet transmitted with the DVB-X2.

A of FIG. 4 shows a first configuration example of the reception device receiving a GSE packet transmitted with the DVB-X2.

In A of FIG. 4, the reception device includes a demodulation LSI (Large Scale Integration) 11 and a CPU (Central Processing Unit) 12.

The demodulation LSI 11 receives a modulated signal of the DVB-X2, demodulates the modulated signal into a BBF, and supplies the BBF to the CPU 12. The CPU 12 restores and outputs the PDU of the IP packet or the like encapsulated in the GSE packet deployed in the data field of the BBF from the demodulation LSI 11 by executing software (program).

B of FIG. 4 shows a second configuration example of the reception device receiving the GSE packet transmitted with the DVB-X2.

In B of FIG. 4, the same reference numerals are given to portions corresponding to those of the case of A of FIG. 4 and the description thereof will be appropriately omitted below.

In B of FIG. 4, the reception device is in common with the case of A of FIG. 4 in that the reception device includes a demodulation LSI 11 and is different from the case of A of FIG. 4 in that the reception device includes a dedicated FPGA (Field-Programmable Gate Array) 13 instead of the CPU 12.

In the dedicated FPGA 13, programming is performed to restore the PDU encapsulated in the GSE packet deployed in the data field from the BBF.

The BBF is supplied from the demodulation LSI 11 to the dedicated FPGA 13. The dedicated FPGA 13 restores and outputs the PDU of the IP packet or the like encapsulated in the GSE packet deployed in the data field of the BBF from the demodulation LSI 11.

However, as described above, the DVB-GSE has a general less restricted specification. According to the DVB-GSE, the PDU can be mapped (deployed) flexibly to the GSE packet.

For this reason, there is a concern that mounting of a method of mapping the PDU to the GSE packet may be mounting unique to a user (service provider) providing a service using the GSE packet.

In the DVB-GSE, the maximum size of the PDU deployable to one GSE packet is 4096 bytes. However, a PDU of a maximum of 65536 bytes can be encapsulated in the (plurality of) GSE packets through fragmentation of slicing the PDU into fragments.

In the DVB-GSE, the fragmentation of the PDU is permitted to be performed in parallel on the maximum of 256 PDUs.

That is, during fragmentation of a given PDU and transmission of the fragments, fragmentation and transmission of other PDUs can be performed in parallel (in a time-division manner) on 256 PDUs.

Accordingly, when a method of mapping a PDU to a GSE packet is mounted uniquely for each service provider, it is necessary for a reception device receiving the GSE packet (a BBF in which the GSE packet is deployed) to cope with, for example, several cases such as a case in which the PDU is encapsulated in one GSE packet, a case in which the PDU is fragmented and encapsulated in two or another plurality of GSE packets, and a case in which two or another plurality of PDUs are fragmented in parallel.

As a result, when the reception device receiving the GSE packet is manufactured, it is necessary to perform verification to cope with the above-described several cases, and thus considerable cost (time cost) is necessary for the verification.

Further, since the DVB-GSE is a general specification, initially unpredicted new use cases of a reception device receiving a GSE packet are expected to appear in future. In order to deal with such new use cases, hardware performing a fixed process is not mounted on a reception device, but a CPU or an FPGA serving as a sophisticated component (hardware) capable of adaptively changing a process by programming is preferably mounted, as illustrated in FIG. 4.

However, when a sophisticated component such as a CPU or an FPGA is mounted on a reception device in order to cope with the new use cases, the reception device (the price of the reception device) becomes expensive.

The DVB-GSE specifies that a reception side receives a GSE packet (a GSE packet in which the final fragment of a PDU is deployed) of the final fragment of the PDU and then restructures the original PDU when a PDU is fragmented.

Accordingly, when fragmentation of a PDU can be performed in parallel on the maximum of 256 PDUs, a considerable time is necessary in some cases until a reception side receives the GSE packet of the initial fragment of a PDU, then receives the GSE packet of the final fragment of the PDU, and restructures the original PDU.

As a result, a delay time (latency), i.e., for example, a delay time from start of transmission of a PDU from a transmission side to completion of restructuring of the PDU on a reception side is large in some cases. Therefore, the large latency causes a problem in broadcast performing with a DVB-C2, a DVB-T2, and a DVB-S2 in some cases.

Also, when fragmentation of a PDU can be performed in parallel on the maximum of 256 PDUs, as the worst cases, there is a case in which the 256 PDUs which each have a size of 65536 bytes are fragmented in parallel.

Even in the worst case, in order to restructure the fragmented PDU, it is necessary to mount a high-capacity memory with "65536 bytes×256=16777216 bytes" (16 M(Mega) bytes) on a reception side (a reception device receiving GSE packets). Thus, the reception device becomes expensive.

Here, the 1-byte flag ID (Frag ID) of the GSE header illustrated in FIG. 3 is used when the PDU is fragmented and transmitted.

That is, when the PDU is fragmented and encapsulated in a plurality of GSE packets, the same value is set in the flag IDs of the GSE packets in which the fragments (hereinafter also referred to as PDU fragments) of the same PDU are deployed on the transmission side. Then, on the reception side, the original PDU is restructured from the PDU fragments deployed in the GSE packets having the flag ID of the same value.

In the DVB-GSE, there is no information indicating an order of the PDU fragments on the PDU obtained by fragmenting the PDU. Therefore, the PDU fragments (the GSE packets in which the PDU fragments are deployed) obtained by fragmenting the PDU have to be transmitted in the order on the PDU.

As the flag ID, for example, integer values in the range of 0 to 255 which can be expressed as 1 byte are set.

However, the integer values set as the flag IDs of the GSE packets in which the PDU fragments obtained by fragmenting the PDU are deployed are not available in the flag IDs until all of the PDU fragments constituting the PDU are completely transmitted.

That is, when a given PDU #1 is fragmented and transmitted, the flag ID of the same value V can be allocated in all of the PDU fragments which are constituent elements of the PDU #1. However, the value V is prohibited from being allocated as the flag IDs of PDU cross-sections which are constituent elements of another PDU #2 until all of the PDU cross-sections which are the constituent elements of the PDU #1 in which the flag ID of the value V are deployed are completely transmitted.

Here, the 1-bit start indicator S of the GSE header illustrated in FIG. 3 is set to 1 when the beginning of the PDU is included in the GSE packet, whereas the 1-bit start indicator S is set to 0 when the header of the PDU is not included in the GSE packet.

Also, the 1-bit end indicator E of the GSE header illustrated in FIG. 3 is set to 1 when the ending of the PDU is included in the GSE packet, whereas the 1-bit end indicator E is set to 0 when the ending of the PDU is not included in the GSE packet.

Accordingly, the integer value V set in the flag IDs of the GSE packets in which the PDU fragments are deployed are available after the GSE packets in which the integer value V is set in the flag IDs and the end indicator E is set to 1 are transmitted.

As described above, since the DVB-GSE is the general standard, a reception device receiving and processing the GSE packets in conformity with the DVB-GSE becomes expensive, and therefore it is difficult to reduce the cost.

Accordingly, the present technology realizes low cost of a reception device in conformity with the DVB-GSE by limiting a part of the technology specification of the DVB-GSE to a range in which the DVB-GSE is not violated.

<Overview of the Present Technology>

Figure 5:
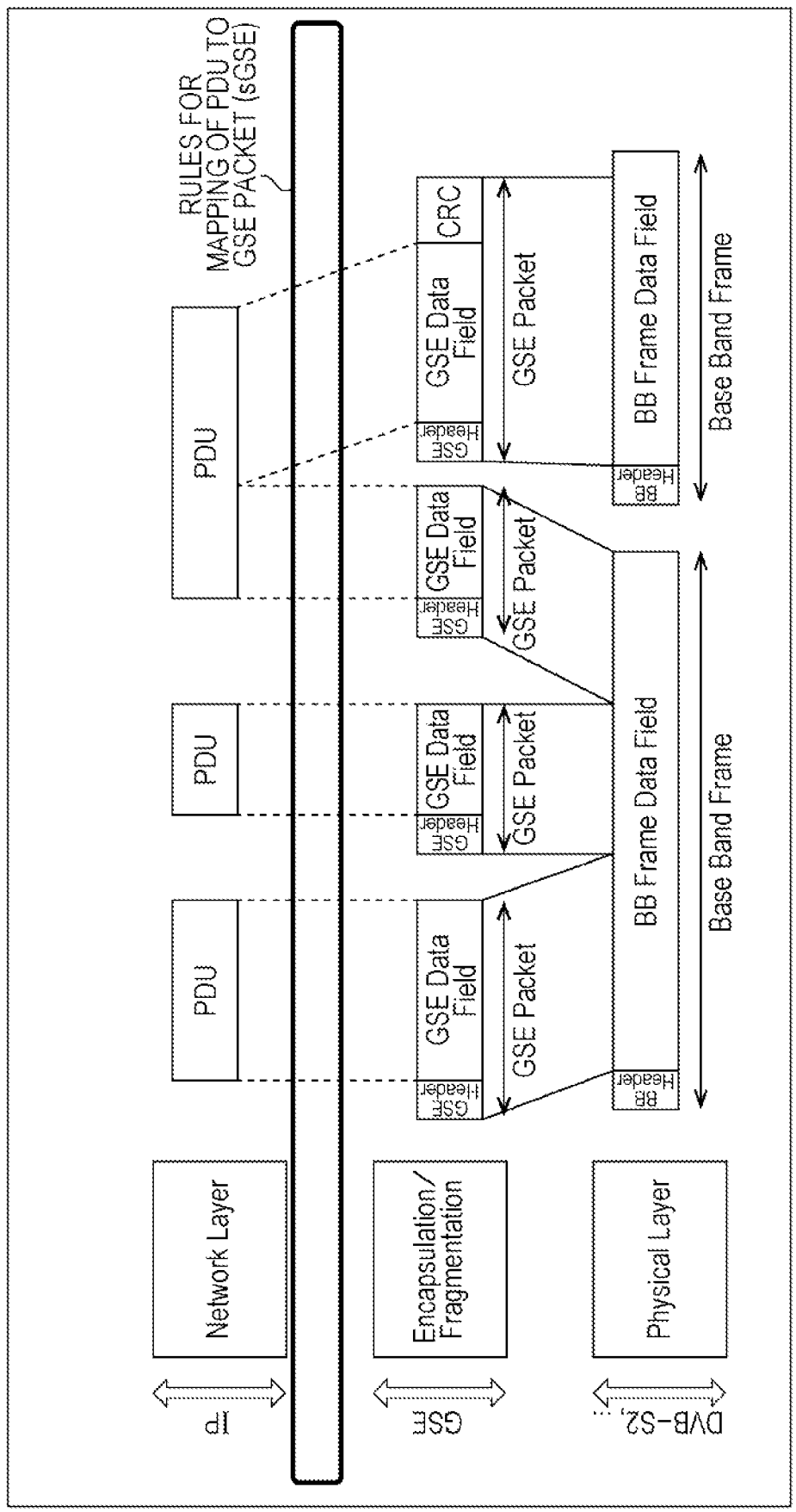
FIG. 5 is a diagram for describing an overview of the present technology.

FIG. 5 is a diagram for describing an overview of the present technology.

That is, FIG. 5 illustrates a data transmission process in a DVB-GSE, as in FIG. 2 described above.

In the present technology, as illustrated in FIG. 5, mapping of a PDU to a GSE packet is regulated (limited) within a range in which the DVB-GSE is not violated.

Here, to facilitate the description, a specification (regulation) that limits the mapping of a PDU to a GSE packet within the range in which the DVB-GSE is not violated is referred to as sGSE (Simple GSE) below.

<Overview of sGSE>

Figure 6:
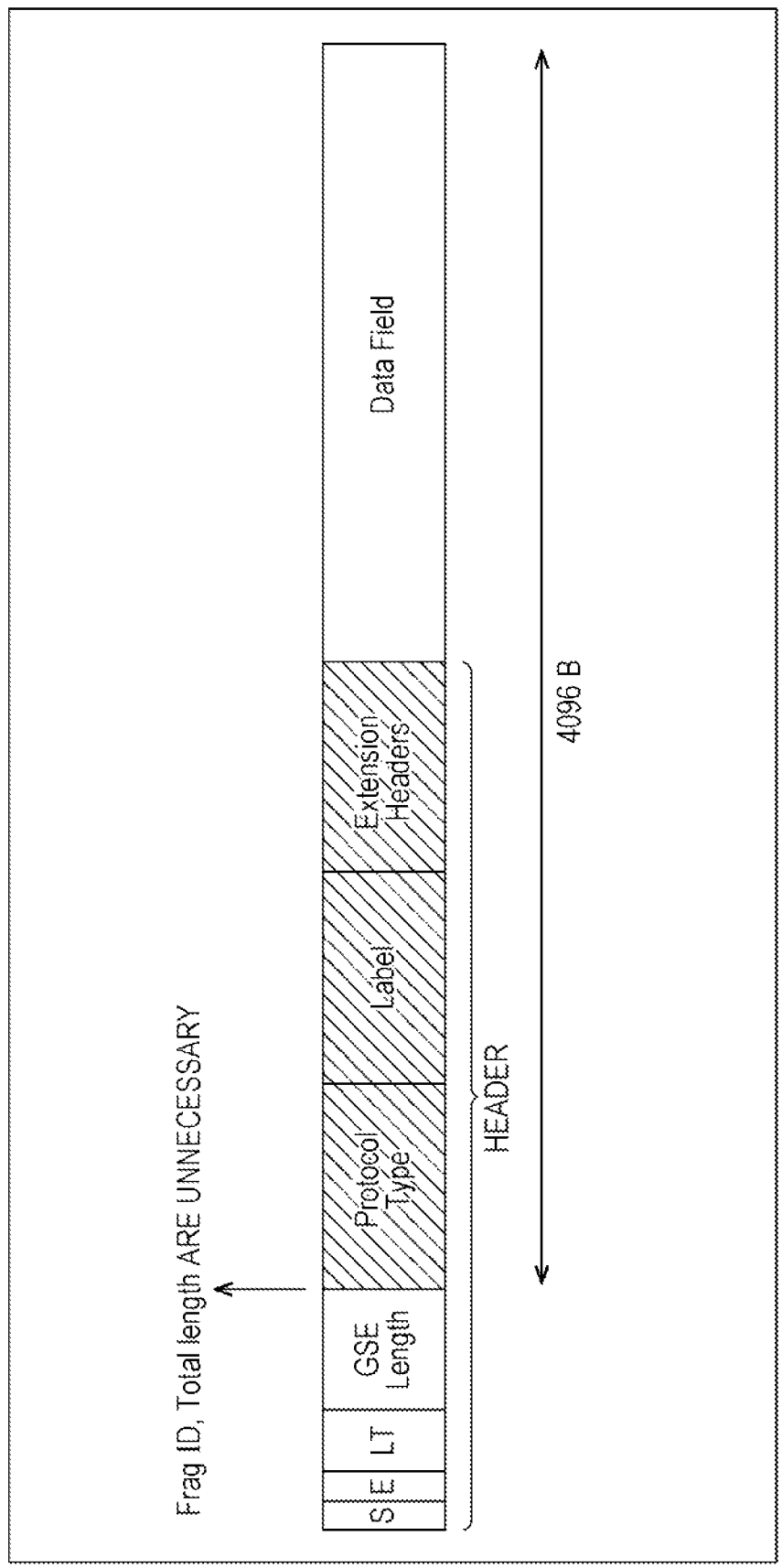
FIG. 6 is a diagram illustrating an example of the format of an sGSE packet.

FIG. 6 is a diagram illustrating an example of the format of an sGSE packet.

Here, an sGSE packet is a GSE packet conforming the sGSE and is also a GSE packet that does not violate the DVB-GSE. However, to facilitate the description, an sGSE packet is assumed below not to be included in a GSE packet unless otherwise stated.

In the sGSE, the maximum size of a PDU encapsulated in a GSE packet in the DVB-GSE is restricted to a predetermined restriction size equal to or less than 4096 bytes.

Accordingly, in the sGSE, PDU encapsulation is performed by setting, as a target, only a PDU of which the maximum size is restricted to the predetermined restriction size equal to or less than 4096 bytes to structure an sGSE packet which is a GSE packet in which a PDU is deployed in a data field.

Here, in the GSE length (GSE Length) of the 12-bit GSE header illustrated in FIG. 3, the size of the GSE packet subsequent to the GSE length is expressed in units of bytes.

In the DVB-GSE, when the GSE length at the time of the allocation of a PDU to a GSE packet has a size equal to or less than 4096 bytes and expressible with 12 bits, the PDU can be encapsulated in one GSE packet without being fragmented.

A flag ID, a total length, a protocol type, a label, an extension header subsequent to the GSE length of the GSE header are optional, as described in FIG. 3. Accordingly, when the optional flag ID, total length, protocol type, label, and extension header are not used, the PDU can be encapsulated in one GSE packet without being fragmented in spite of the fact that the maximum of 4096 bytes are used as the restriction size of the sGSE.

In the sGSE, a size of a PDU which can be encapsulated in one GSE packet without being fragmented is used as the restriction size which is the maximum size of the PDU deployed in the GSE packet.

As described above, by using the size of the PDU which can be encapsulated in one GSE packet without being fragmented as the restriction size, the 1-byte flag ID (Frag ID) and the 2-byte total length (Total length) necessary only at the time of the fragmentation of the PDU become unnecessary in the GSE header.

As a result, since the 1-byte flag ID and the 2-byte total length are not included in a header (hereinafter also referred to as an sGSE header) of the sGSE packet, the size can become compact and transmission efficiency can be improved compared to the GSE header in which the flag ID and the total length are optional.

In the DVB-GSE, the maximum size of a PDU which can be encapsulated in one GSE packet without the fragmentation of the PDU is 4096 bytes, as described above. Therefore, in the sGSE, a value equal to or less than 4096 bytes (for example, a value equal to or greater than 1 byte) can be used as the restriction size, i.e., the maximum size of a PDU to be deployed (encapsulated in an sGSE packet) to the data field of the sGSE packet.

Here, most of the use cases of the data transmission in the DVB-GSE are assumed to be transmission of an Ethernet frame or an IP packet.

Thus, the restriction size can be determined based on the size (maximum size) of an Ethernet frame or an IP packet.

FIG. 7 is a diagram illustrating the frame structure of an Ethernet frame.

The Ethernet frame is structured such that a 7-byte preamble (Preamble), a 1-byte SFD (Start of Frame Delimiter), a 6-byte destination MAC address (MAC destination), a 6-byte source MAC address (MAC source), a 2-byte type/length (Ethertype/length), a 4-byte tag (802.1Q tag), a 42 to 1500-byte payload (payload), a 4-byte FCS (Frame check sequence), and a 12-byte gap (Interframe gap) are arranged side by side in this order.

The tag is an optional field and is used for data transmission in VLAN (Virtual Local Area Network) of IEEE802.1q.

In the Ethernet frame in FIG. 7, the preamble, the SFD, and the gap are treated as the physical layer and the remaining destination MAC address to the FCS are treated as the data link layer. Therefore, FIG. 7 illustrates the format of the Ethernet frame treated as the layers equal to or lower than the data link layer.

For example, 1542 (=7+1+6+6+2+4+1500+4+12) bytes which is the maximum size of the Ethernet frame in FIG. 7 can be used as the restriction size of the sGSE.

For example, 1538 (=1542−4) bytes which is the maximum size obtained by excluding the 4-byte tag which is an optical field from the Ethernet frame in FIG. 7 can be used as the restriction size.

For example, 1530 (=1542−12) bytes which is the maximum size obtained by excluding the 12-byte gap treated as the physical layer from the Ethernet frame in FIG. 7 can be used as the restriction size.

For example, 1526 (=1542−4−12) bytes obtained by excluding the 4-byte tag which is an optional field and the 12-byte gap treated as the physical layer from the Ethernet frame in FIG. 7 can be used as the restriction size.

For example, 1522 (=1542−7−1−12) bytes obtained by excluding the 7-byte preamble and the 1-byte SFD treated as the physical layer and the 12-byte gap from the Ethernet frame in FIG. 7 can be used as the restriction size.

For example, 1518 (=1542−7−1−12−4) bytes obtained by excluding the 7-byte preamble and the 1-byte SFD treated as the physical layer, the 12-byte gap, and the 4-byte tag which is an optional field from the Ethernet frame in FIG. 7 can be used as the restriction size.

As described above, the restriction size can be determined based on the size of the Ethernet frame and can also be determined based on the size of an IP packet.

Here, the maximum length of an IP packet is 65535 bytes. However, in many communication networks other than the Internet, an IP packet is deployed in the payload of an Ethernet packet and is transmitted. In this case, an MTU (Maximum Transmission Unit) of the IP packet is 1500 bytes (octets) deployable to the payload of the Ethernet packet.

For example, 1500 bytes which is the MTU of an IP packet, as described above, can be used as the restriction size.

When the TCP is used in the transport layer which is a high-order layer of the IP packet, both sizes of an IP (IPv4) header and a TCP header are at least 20 bytes. Therefore, the maximum size of the payload of the IP packet with the MTU of 1500 bytes is 1460 (=1500−20−20) bytes.

When an Ethernet frame or an IP packet is assumed to be mostly transmitted in the data transmission in the DVB-GSE, the value of about 1500 bytes is used as the restriction size, as described above, so that the Ethernet frame, the IP packet, or the like can be transmitted with the sGSE.

Figure 8:
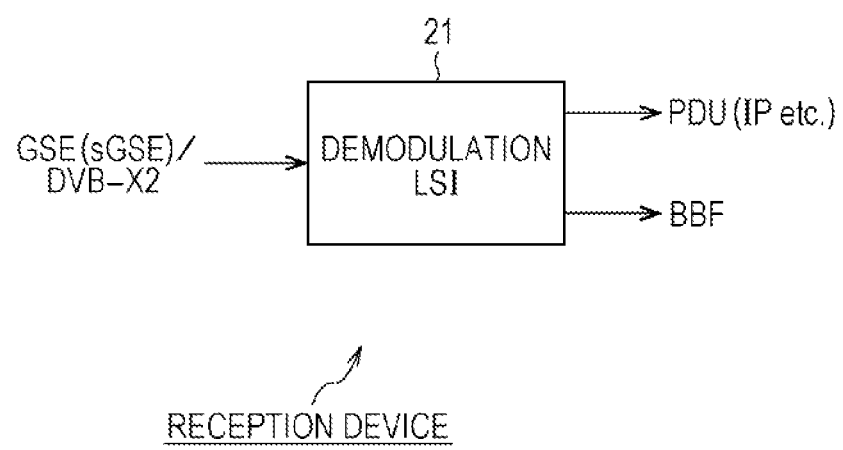
FIG. 8 is a block diagram illustrating an overview of an example of the configuration of a reception device receiving the sGSE packet to be transmitted to the DVB-X2 in conformity with the sGSE.

FIG. 8 is a block diagram illustrating an overview of an example of the configuration of a reception device receiving an sGSE packet transmitted with the DVB-X2 in conformity with the sGSE.

In FIG. 8, the reception device includes a demodulation LSI 21.

The demodulation LSI 21 receives a modulated signal of the DVB-X2 and demodulates the modulated signal in the BBF.

When an sGSE packet is included in a BBF (when an sGSE packet is deployed in the data field of a BBF), the demodulation LSI 21 extracts the sGSE packet from the BBF. Then, the demodulation LSI 21 restructures a PDU (for example, an IP packet) from the sGSE packet, i.e., extracts the PDU deployed in the data field of the sGSE packet and outputs the PDU to the outside.

Since the PDU included in the sGSE packet is not fragmented, the process of restructuring the PDU can be easily performed by extracting the PDU from the sGSE packet, and thus can be performed in the demodulation LSI 21 without using a sophisticated component such as a CPU or an FPGA.

By using, for example, 1542 bytes described with reference to FIG. 7 as the restriction size, the PDU such as an Ethernet frame or an IP packet generally used can be transmitted with the sGSE.

However, since the PDU exceeding the restriction size may not be transmitted with the sGSE, the PDU is transmitted with the DVB-GSE.

In this case, the demodulation LSI 21 of the reception device in FIG. 8 receives the PDU transmitted with the DVB-GSE, i.e., a GSE packet (a modulated signal of the BBF including the GSE packet), but may not restructure the PDU by performing the same process on the GSE packet as in the sGSE packet. For this reason, in regard to the GSE packet, the demodulation LSI 21 outputs the BBF including the GSE packet to the outside without demodulation.

As described above, in regard to the GSE packet, the demodulation LSI 21 outputs the BBF including the GSE packet to the outside without change and the process thereon can be entrusted to the outside. Thus, compatibility (backward compatibility) can be ensured for the GSE packet and the process can thus be performed flexibly.

In the reception device conforming to the sGSE, the fragmented PDU is not a restructuring target and the PDU included in the sGSE packet can be easily restructured in the demodulation LSI 21 without using a sophisticated component such as a CPU or an FPGA. Therefore, it is not necessary to provide a sophisticated component such as a CPU or an FPGA, and thus the reception device can be simply configured. As a result, the low cost of the reception device can be realized.

In the reception device conforming to the sGSE, since the fragmented PDU is not a restructuring target, it is not necessary to mount a memory of 16 M bytes which is necessary to restructure the fragmented PDU on the assumption of the worst case. Accordingly, the capacity of the memory to be mounted on the reception device can be reduced, and consequently the low cost of the reception device can be realized.

In the reception device confirming to the sGSE, since the fragmented PDU is not a restructuring target, use cases (parameters) for which verification is performed are reduced, and thus a time necessary for the verification, can be shortened.

Since the fragmentation of the PDU is not performed in the sGSE, a latency (for example, a latency from start of transmission of the PDU from the transmission side to the completion of the restructuring of the PDU on the reception side) is shorter than that of a case in which the PDU is fragmented. Accordingly, it is possible to prevent a problem from occurring in broadcast performed with the DVB-C2, the DVB-T2, or the DVB-S2 due to the large latency.

<Embodiment of Transmission Device to which the Present Technology is Applied>

Figure 9:
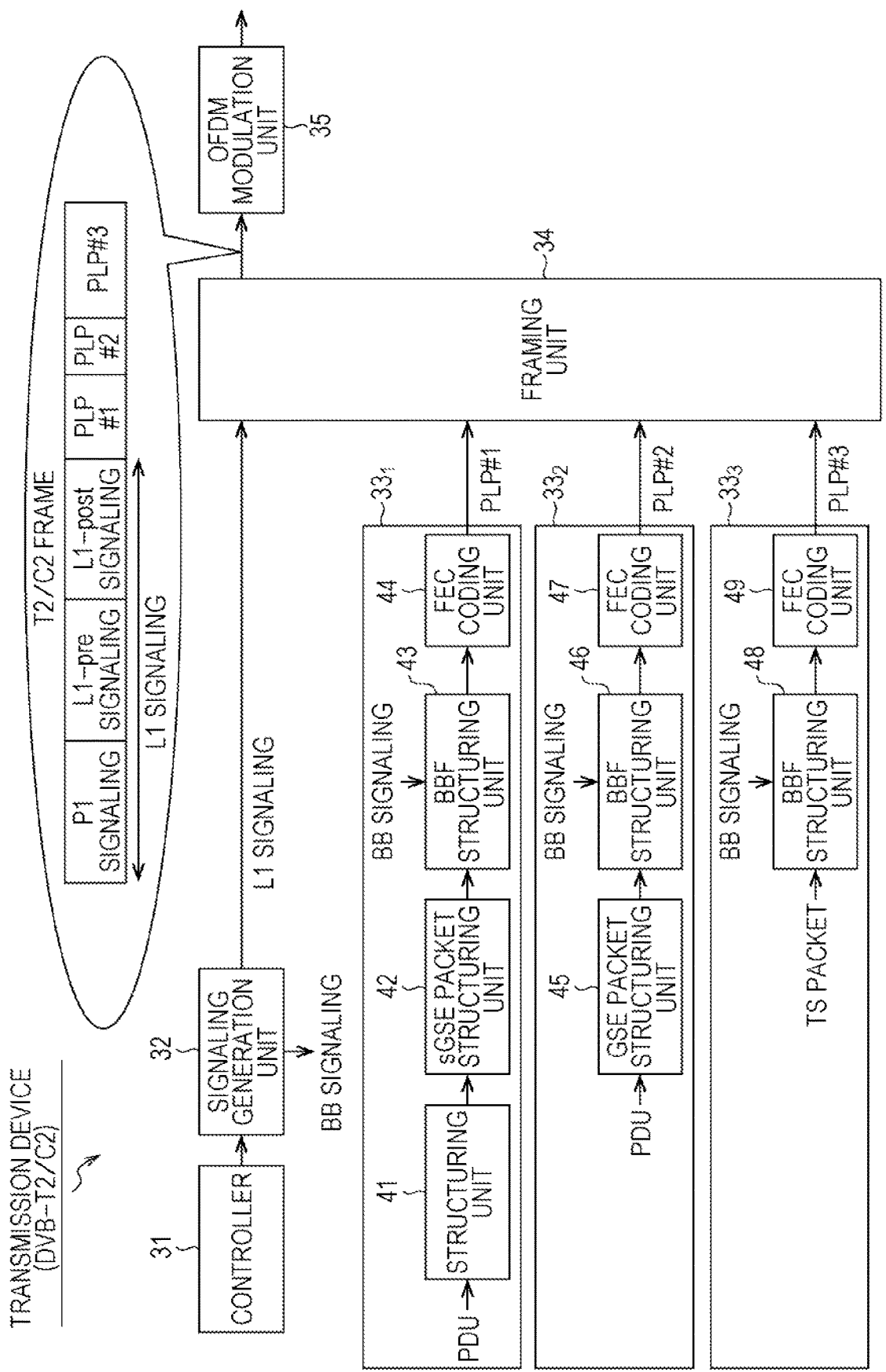
FIG. 9 is a block diagram illustrating an example of the configuration of a transmission device of an embodiment to which the present technology is applied.

FIG. 9 is a block diagram illustrating an example of the configuration of a data processing device serving as a transmission device of an embodiment to which the present technology is applied.

In FIG. 9, the transmission device includes a controller 31, a signaling generation unit 32, data structuring units $33_1$, $33_2$, and $33_3$, a framing unit 34, and an OFDM (Orthogonal Frequency Division Multiplexing) modulation unit 35 and performs broadcast in conformity with, for example, the DVB-T2 or the DVB-C2.

The controller 31 controls the signaling generation unit 32 and other necessary blocks according to data or the like to be transmitted from the transmission device.

The signaling generation unit 32 generates BB signaling and L1 signaling (P1 signaling, L1-pre signaling, and L1-post signaling) suitable for the data to be transmitted from the transmission device under the control of the controller 31.

Then, the signaling generation unit 34 supplies the BB signaling to a BBF structuring unit 43, 46, or 48 and supplies the L1 signaling to the framing unit 34.

The data structuring unit $33_1$ includes an inspection unit 41, an sGSE packet structuring unit 42, the BBF structuring unit 43, and an FEC (Forward Error Correction) coding unit 44, structuring a PLP (Physical Layer Pipe) (hereinafter also referred to as PLP #1) including an SGSE packet, and supplies the PLP to the framing unit 34.

For example, a PDU of an IP packet, an Ethernet frame, or the like included in the sGSE packet (deployed in the data field of the sGSE packet) is supplied to the inspection unit 41.

The inspection unit 41 checks (inspects) in advance whether the size of the PDU supplied to the inspection unit 41 is equal to or less than the restriction size determined.

When the size of the PDU supplied to the inspection unit 41 is not equal to or less than the restriction size, the inspection unit 41 performs a predetermined error process. As the error process, for example, the PDU with a size not equal to or less than the restriction size can be destroyed or the fact that the PDU has a size not equal to or less than the restriction size can be reported to a higher layer.

When the size of the PDU supplied to the inspection unit 41 is equal to or less than the restriction size, the inspection unit 41 supplies the PDU to the sGSE packet structuring unit 42.

The sGSE packet structuring unit 42 structures a GSE packet in which the PDU from the inspection unit 41 is deployed in the data field, i.e., an sGSE packet, and supplies the sGSE packet to the BBF structuring unit 43.

Here, only the PDU with a size equal to or less than the restriction size is supplied from the inspection unit 41 to the sGSE packet structuring unit 42. Accordingly, the sGSE packet structuring unit 42 sets only a PDU of which the maximum size is restricted to the restriction size as a target and structures the sGSE packet which is a GSE packet conforming to the DVB-GSE.

The BBF structuring unit 43 deploys the sGSE packet from the sGSE packet structuring unit 42 to the data field, structures the BBF in which the BB signaling from the signaling generation unit 32 is deployed in the BB header, and supplies the BBF to the FEC coding unit 44.

The FEC coding unit 44 performs FEC coding to code the BBF from the BBF structuring unit 43 into an FEC code (error correction code (ECC)) such as a BCH code or an LDPC (Low-Density Parity-Check) code and supplies an FEC frame (FECFRAME), which is the FEC code of the BBF obtainable as the result of the FEC coding, as PLP #1 to the framing unit 34.

When it is ensured that the maximum size of the PDU supplied to the data structuring unit $33_1$ is restricted to the restriction size by any method, the data structuring unit $33_1$ can be configured excluding the inspection unit 41.

The data structuring unit $33_2$ includes a GSE packet structuring unit 45, a BBF structuring unit 46, and an FEC coding unit 47, structures an PLP (hereinafter also referred to as PLP #2) including the GSE packet, and supplies the PLP to the framing unit 34.

For example, a PDU of an IP packet, an Ethernet frame, or the like included in the GSE packet (deployed in the data field of the GSE packet) is supplied to the GSE packet structuring unit 45.

The GSE packet structuring unit 45 structures a GSE packet in which the PDU supplied to the GSE packet structuring unit 45 is deployed in the data field and supplies the GSE packet to the BBF structuring unit 46.

Here, the maximum size of the PDU supplied to the GSE packet structuring unit 45 is not particularly restricted to the restriction size. Accordingly, when a PDU with a size exceeding the restriction size is supplied to the GSE packet structuring unit 45 in some cases, consequently, the PDU is fragmented and one PDU is deployed in (encapsulated in) a plurality of GSE packets in some cases.

The BBF structuring unit 46 deploys the GSE packet from the GSE packet structuring unit 45 to the data field, structures a BBF in which the BB signaling from the signaling generation unit 32 is deployed in the BB header, and supplies the BBF to the FEC coding unit 47.

The FEC coding unit 47 performs the FEC coding on the BBF from the BBF structuring unit 46 and supplies a consequently obtainable FEC frame as PLP #2 to the framing unit 34.

The data structuring unit $33_3$ includes a BBF structuring unit 48 and an FEC coding unit 49, structures a PLP (hereinafter also referred to as PLP #3) including a TS (Transport Stream) packet, and supplies the PLP to the framing unit 34.

The TS packet is supplied to the BBF structuring unit 48.

The BBF structuring unit 48 structures a BBF in which the TS packet supplied to the BBF structuring unit 48 is deployed in the data field and the BB signaling from the signaling generation unit 32 is deployed in the BB header and supplies the BBF to the FEC coding unit 49.

The FEC coding unit 49 performs the FEC coding on the BBF from the BBF structuring unit 48 and supplies the consequently obtainable FEC frame as PLP #3 to the framing unit 34.

The framing unit 34 structures a T2 frame of the DVB-T2 or a C2 frame of the DVB-C2 including the L1 signaling from the signaling generation unit 32 and at least one PLP among PLP #1 to PLP #3 from the data structuring units $33_1$ to $33_3$ and supplies the T2 frame or the C2 frame to the OFDM modulation unit 35.

The OFDM modulation unit 35 performs OFDM modulation on the T2 frame or the C2 frame from the framing unit 34 and transmits a consequently obtainable modulated signal.

In the DVB-T2, FEC codes with different parameters (for example, a coding ratio or the like of the LDPC code as the FEC code) can be used in PLP units. Accordingly, the parameters of the FEC codes included in the PLPs forming the T2 frame are not limited to being the same. The same also applies to the DVB-C2.

In the transmission device in FIG. 9, only one data structuring unit $33_1$ is installed as the data structuring unit that structures the PLP including the sGSE packet. However, a plurality of data structuring units that structure PLPs including the sGSE packets can be provided. The same also applies to the data structuring unit that structures the PLP including the GSE packet or the data structuring unit that structures the PLP including the TS packet.

In the transmission device in FIG. 9, it is not essential that the data structuring unit $33_2$ that structures the PLP including the GSE packet or the data structuring unit $33_3$ that structures the PLP including the TS packet is provided.

Figure 10:
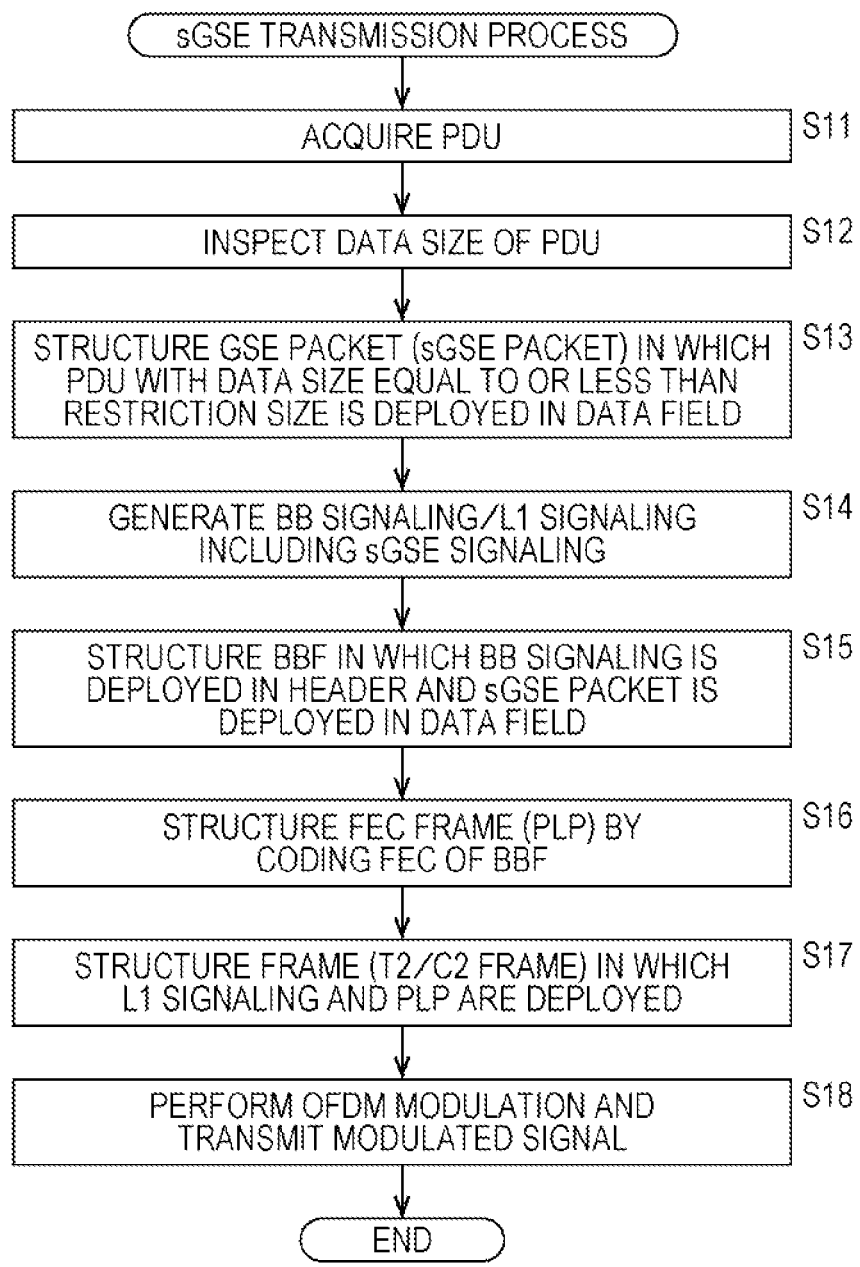
FIG. 10 is a flowchart for describing a process (sGSE transmission process) of the transmission device transmitting the sGSE packet.

FIG. 10 is a flowchart for describing a process (sGSE transmission process) of the transmission device in FIG. 9 when the sGSE packet (a modulated signal including the sGSE packet) is transmitted.

In steps S11 to S16, the data structuring unit $33_1$ structures PLP #1 including the sGSE packet and supplies PLP #1 to the framing unit 34.

That is, in step S11, the inspection unit 41 acquires the PDU included in the sGSE packet and the process proceeds to step S12.

In step S12, the inspection unit 41 checks (inspects) the size of the PDU.

When the inspection unit 41 confirms that the size of the PDU is not equal to or less than the restriction size as the result of the checking of the size of the PDU, the inspection unit 41 performs a predetermined error process and the sGSE transmission process ends.

Conversely, when the inspection unit 41 confirms that the size of the PDU is equal to or less than the restriction size, the inspection unit 41 supplies the PDU to the sGSE packet structuring unit 42 and the process proceeds from step S12 to step S13.

In step S13, the sGSE packet structuring unit 42 structures the sGSE packet which is the GSE packet in which the PDU from the inspection unit 41, i.e., the PDU of which the maximum size is restricted to the restriction size, is deployed in the data field and supplies the sGSE packet to the BBF structuring unit 43, and then the process proceeds to step S14.

In step S14, the signaling generation unit 32 generates the BB signaling and the L1 signaling under the control of the controller 31. Further, the signaling generation unit 34 supplies the BB signaling to the BBF structuring unit 43 and supplies the L1 signaling to the framing unit 34, and then the process proceeds from step S14 to step S15.

The BB signaling or the L1 signaling generated by the signaling generation unit 32 includes sGSE signaling to be described below, as necessary.

In step S15, the BBF structuring unit 43 deploys the sGSE packet from the sGSE packet structuring unit 42 to the data field, structures the BBF in which the BB signaling from the signaling generation unit 32 is deployed in the BB header, and supplies the BBF to the FEC coding unit 44, and then the process proceeds to step S16.

In step S16, the FEC coding unit 44 performs the FEC coding on the BBF from the BBF structuring unit 43 and supplies the consequently obtainable FEC frame as PLP #1 to the framing unit 34, and then the process proceeds to step S17.

As described above, the data structuring unit $33_1$ structures the FEC frame including the sGSE packet and supplies the FEC frame as PLP #1 to the framing unit 34, and concurrently, as necessary, for example, the data structuring unit $33_2$ structures the FEC frame including the GSE packet and supplies the FEC frame as PLP #2 to the framing unit 34 and the data structuring unit $33_3$ structures the FEC frame including the TS packet and supplies the FEC frame as PLP #3 to the framing unit 34.

In step S17, the framing unit 34 structures the t2 frame or the C2 frame including the L1 signaling from the signaling generation unit 32 and at least one PLP among PLP #1 to PLP #3 from the data structuring units $33_1$ to $33_3$ and supplies the T2 frame or the C2 frame to the OFDM modulation unit 35, and then the process proceeds to step S18.

In step S18, the OFDM modulation unit 35 performs the OFDM modulation on the T2 frame or the C2 frame from the framing unit 34 and transmits the consequently obtainable modulated signal, and then the sGSE transmission process ends.

The sGSE transmission process in FIG. 10 is repeatedly performed with a pipeline.

<sGSE Signaling in DVB-T2 or DVB-C2>

When the sGSE packet is transmitted by the sGSE in which the DVB-GSE is restricted, the reception device receiving the sGSE packet preferably transmits sGSE signaling, which is signaling used to identify the fact that data is the sGSE packet in a layer (the data link layer or the physical layer) equal to or lower than the data link layer of the OSI reference model, together with the sGSE packet to appropriately process the sGSE packet.

In the DVB-T2 or the DVB-C2, the sGSE signaling can be included in, for example, the BB signaling present in each BBF or the L1-post signaling present in each PLP in the L1 signaling.

Figure 11:
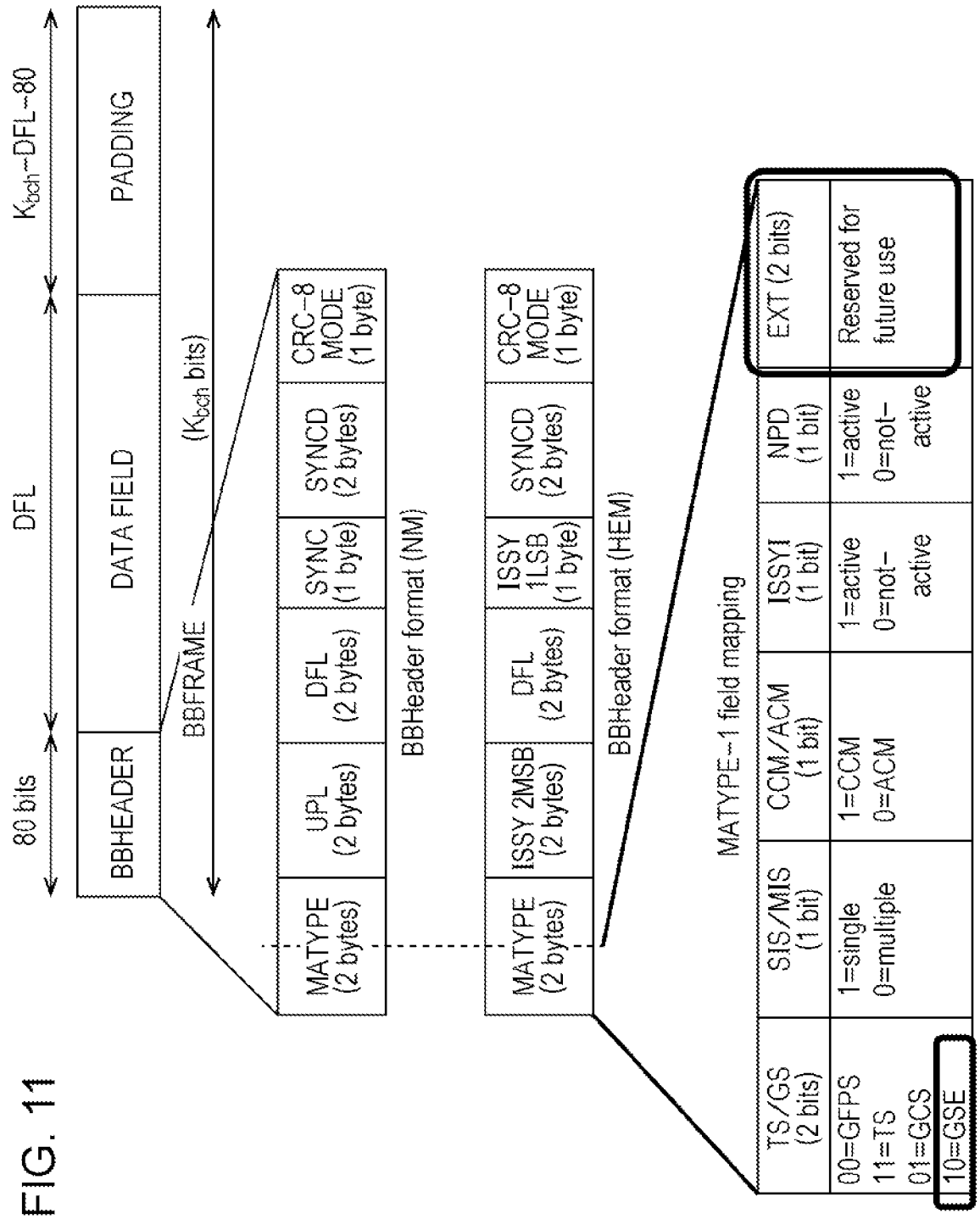
FIG. 11 is a diagram for describing a first example of sGSE signaling used in a DVB-T2 or a DVB-C2.

FIG. 11 is a diagram for describing a first example (hereinafter also referred to as first sGSE signaling for T2/C2) of the sGSE signaling used with the DVB-T2 or the DVB-C2.

That is, FIG. 11 illustrates a BBF (BBFRAME) used with the DVB-T2 or the DVB-C2.

The BBF used with the DVB-T2 or the DVB-C2 includes a BB header (BBHEADER), a data field (DATA FIELD), and necessary padding (PADDING).

As the BB header of the BBF used with the DVB-T2 or the DVB-C2, there are a BB header for an NM (Normal Mode) used when a PLP mode is the NM and a BB header for an HEM (High Efficiency Mode) used when the PLP mode is the HEM. The BB header for the NM and the BB header for the HEM are both 80-bit data.

The BB header for the NM is structured such that a 2-byte MATYPE, a 2-byte UPL, a 2-byte DFL, a 1-byte SYNC, a 2-byte SYNCD, and a 1-byte CRC-8 MODE are arranged side by side in this order.

The BB header for the HEM is structured such that a 2-byte MATYPE, a 2-byte ISSY, a 2-byte DFL, a 1-byte ISSY, a 2-byte SYNCD, and a 1-byte CRC-8 MODE are arranged side by side in this order.

The 1-byte beginning of the 2-byte MATYPE of the above-described BB header is called an MATYPE-1. In the 1-byte MATYPE-1, a 2-bit TS/GS, a 1-bit SIS/MIS, a 1-bit CCM/ACM, a 1-bit ISSYI, a 1-bit NPD, and a 2-bit EXT are allocated in this order.

The DVB-T2 and the DVB-C2 specify that the TS/GS is set to 11 (binary numbers) when the TS packet is included (when the TS packet is deployed in the data field of the BBF) in the BBF and the TS/GS is set to 10 when the GSE packet is included in the BBF.

In the DVB-T2 and the DVB-C2, the EXT is currently unused (undefined) (Reserved).

In the sGSE signaling, for example, the TS/GS and the unused EXT can be used.

That is, in the sGSE signaling, for example, it is possible to adopt a method of setting the TS/GS to 10 indicating the GSE packet and setting the unused EXT to 11 (binary numbers) or the like as a specific value.

According to the sGSE signaling, when the TS/GS is set to 10 and the EXT is set to 11 which is the specific value, the fact that the data field (data of the data field) of the BBF is the sGSE packet (the fact that the sGSE packet is included in the BBF) can be identified.

When the TS/GS is set to 10 and the EXT is set to a value other than 11 which is the specific value, the fact that the data field (data of the data field) of the BBF is the GSE packet (the fact that the GSE packet is included in the BBF) can be identified.

Figure 12:
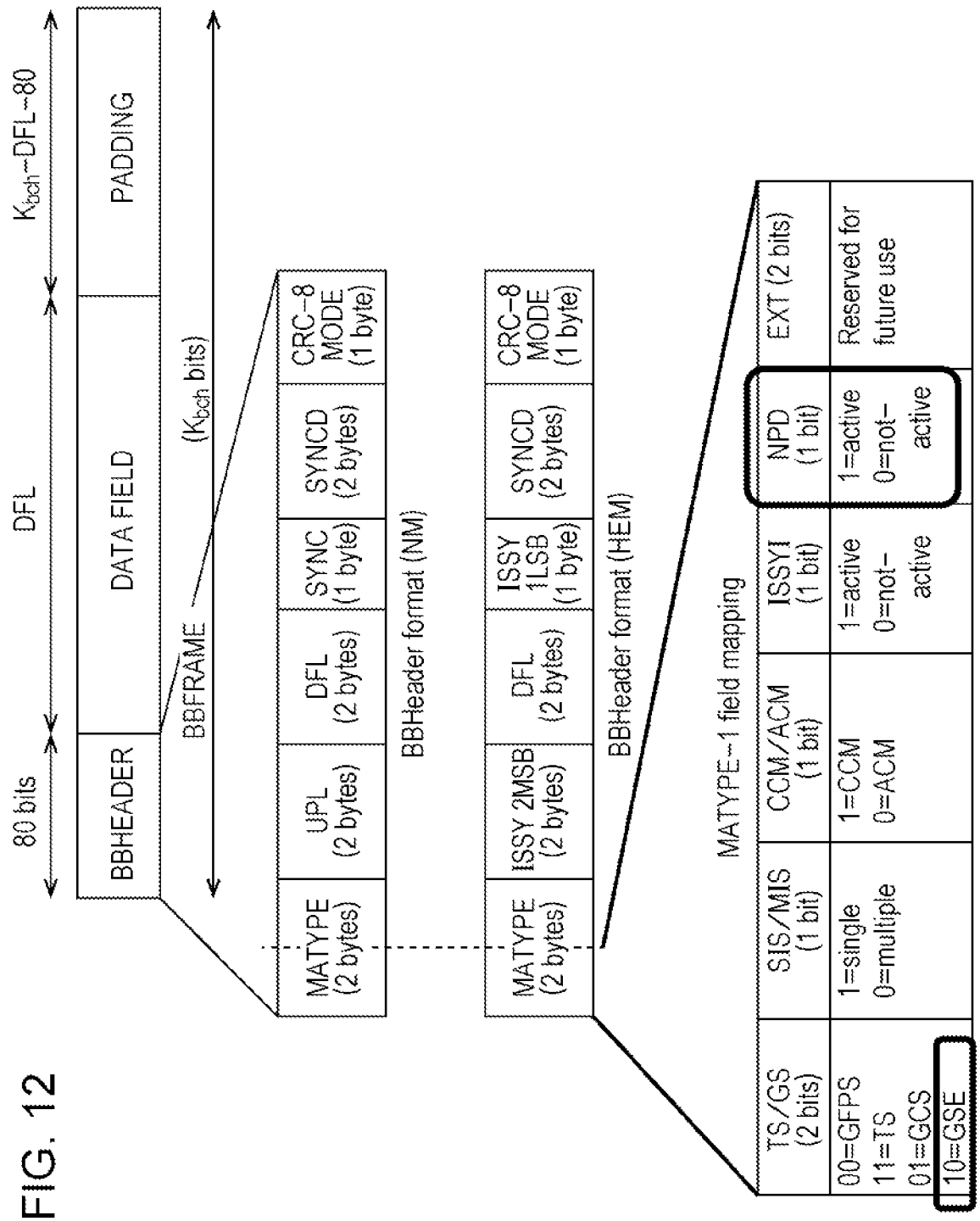
FIG. 12 is a diagram for describing a second example of the sGSE signaling used in the DVB-T2 or the DVB-C2.

FIG. 12 is a diagram for describing a second example (hereinafter also referred to as second sGSE signaling for T2/C2) of the sGSE signaling used with the DVB-T2 or the DVB-C2.

That is, FIG. 12 illustrates a BBF used with the DVB-T2 or the DVB-C2 as in FIG. 11.

As described with reference to FIG. 11, the 1-byte MATYE-1 at the beginning of the 2-byte MATYPE of the BB header includes a 2-bit TS/GS and a 1-bit NPD. When the TS/GS is set to 10 indicating that the GSE packet is included in the BBF, the NPD does not function (the NPD functions when the TS packet is included in the BBF) in the present DVB-T2 or the DVB-C2.

Accordingly, in the sGSE signaling, the TS/GS and the NPD which does not function when the TS/GS is 10 can be used.

That is, when the data field of the BBF is the GSE packet or the sGSE packet, the TS/GS is set to 10. The NPD can be set depending on whether the data field of the BBF is one of the GSE packet and the sGSE packet.

Specifically, for example, when the data field of the BBF is the GSE packet, the NPD can be set to 0 (binary number). When the data field of the BBF is the sGSE packet, the NPD can be set to 1.

According to the sGSE signaling, when the TS/GS is set to 10 and the NPD is set to 1, the fact that the data field of the BBF is the sGSE packet can be identified.

When the TS/GS is set to 10 and the NPD is set to 0, the fact that the GSE packet is the data field of the BBF can be identified.

Figure 13:
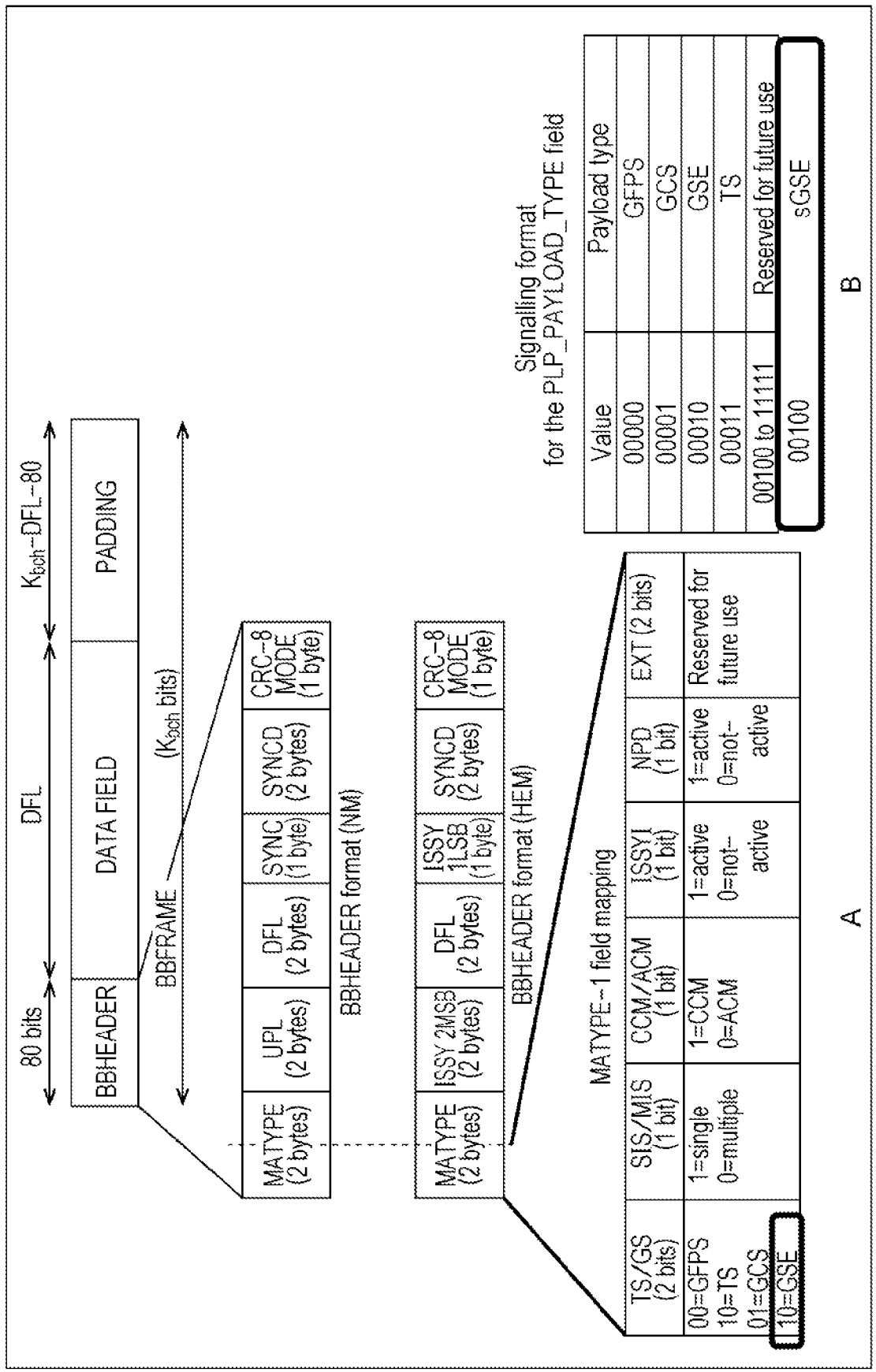
FIG. 13 is a diagram for describing a third example of the sGSE signaling used in the DVB-T2 or the DVB-C2.

FIG. 13 is a diagram for describing a third example (hereinafter also referred to as third sGSE signaling for T2/C2) of the sGSE signaling used with the DVB-T2 or the DVB-C2.

That is, A of FIG. 13 illustrates a BBF used with the DVB-T2 or the DVB-C2 as in FIG. 11 and B of FIG. 13 illustrates a PLP_PAYLOAD_TYPE included in the L1-post signaling.

The PLP_PAYLOAD_TYPE is set in each PLP included in the T2 frame or the C2 frame to which the L1-post signaling including the PLP_PAYLOAD_TYPE is deployed and indicates data included in the corresponding PLP.

The PLP_PAYLOAD_TYPE is 5-bit information and 5 values of 00000 to 00011 (binary numbers) are used in the DVB-T2 and the DVB-C2 at present.

For example, it is specified that when the TS packet is included in the PLP, the PLP_PAYLOAD_TYPE is set to 00011, whereas when the GSE packet is included in the PLP, the PLP_PAYLOAD_TYPE is set to 00010.

At present, in the DVB-T2 and the DVB-C2, 00100 to 11111 are unused for the PLP_PAYLOAD_TYPE.

Accordingly, in the sGSE signaling, the PLP_PAYLOAD_TYPE can be used.

That is, it is possible to adopt, for example, a method of setting the PLP_PAYLOAD_TYPE to 00100 or the like which is a specific value among the unused values as the sGSE signaling.

According to the sGSE signaling, when the PLP_PAYLOAD_TYPE is set to 00100 which is the specific value, the fact that the sGSE packet is the data field of the BBF included in the PLP can be identified.

When the sGSE signaling (the third sGSE signaling for T2/C2) using the PLP_PAYLOAD_TYPE is adopted and the PLP_PAYLOAD_TYPE is set to 00100 which is the specific value, i.e., the data field of the BBF included in the PLP is the sGSE packet, the TS/GS included in the BB header of the BBF in which the sGSE packet is deployed is set to 10 indicating the GSE packet. This is because the sGSE packet not only conforms to the sGSE but also conforms DVB-GSE.

In the DVB-T2 and the DVB-C2, one of the first sGSE signaling to the third sGSE signaling for T2/C2 can be solely used as the sGSE signaling, the first sGSE signaling and the third sGSE signaling for T2/C2 can be used together, or the second sGSE signaling and the third sGSE signaling for T2/C2 can be used together.

When the first sGSE signaling or the second sGSE signaling for 12/C2 is solely used, whether the data field of the BBF is the sGSE packet can be identified with reference to the BB header of the BBF.

When the third sGSE signaling for T2/C2 is solely used, whether the data of the PLP included in the T2 frame or the C2 frame is the sGSE packet can be identified with reference to the L1-post signaling of the T2 frame or the C2 frame.

When the first sGSE signaling and the third sGSE signaling for 12/C2 are used together and the second sGSE signaling and the third sGSE signaling for 12/C2 are used together, whether the data is the sGSE packet can be identified with reference to the L1-post signaling of the T2 frame or the C2 frame and with reference to the BB header of the BBF.

In the transmission device in FIG. 9, the signaling generation unit 32 generates the BB signaling or the L1-post signaling (the L1 signaling including the L1-post signaling) including the above-described sGSE signaling in regard to the BBF structured by the BBF structuring unit 43 or PLP #1 structured by the data structuring unit $33_1$.

As described above, by generating the sGSE signaling, including the sGSE signaling in the T2 frame or the C2 frame, and transmitting the sGSE signaling together with the BBF (the PLP including the BBF), a reception device receiving the T2 frame or the C2 frame can easily identify whether the data field of the BBF included in the T2 frame or the C2 frame is the sGSE packet based on the sGSE signaling.

That is, the fact that the data field of the BBF is the sGSE packet can be identified without mounting complicated rules or logics analyzing the data field of the BBF on the reception device to identify the fact that the data field of the BBF is the sGSE packet.

<Embodiment of Reception Device to which the Present Technology is Applied>

Figure 14:
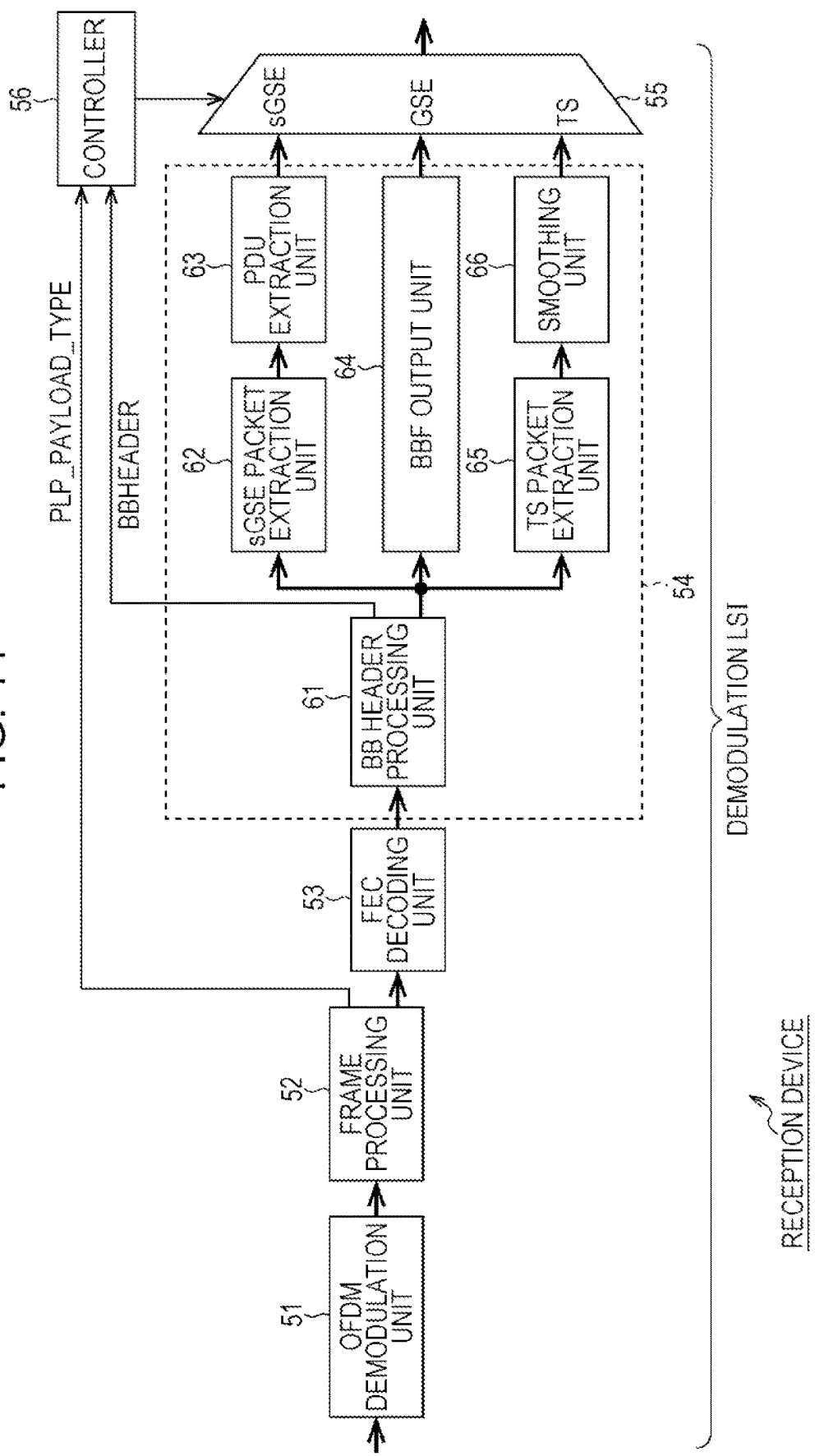
FIG. 14 is a block diagram illustrating an example of the configuration of a reception device of an embodiment to which the present technology is applied.

FIG. 14 is a block diagram illustrating an example of the configuration of a data processing device serving as a reception device of an embodiment to which the present technology is applied.

In FIG. 14, the reception device includes an OFDM demodulation unit 51, a frame processing unit 52, an FEC decoding unit 53, a stream processing unit 54, an output unit 55, and a controller 56 and receives broadcast in conformity with, for example, the DVB-T2 or the DVB-C2.

The OFDM demodulation unit 51 functions as a reception unit that receives a modulated signal transmitted from the transmission device in FIG. 9. The OFDM demodulation unit 51 receives the modulated signal transmitted from the transmission device in FIG. 9, performs OFDM demodulation, and supplies a consequently obtainable T2 frame or C2 frame to the frame processing unit 52.

For example, the frame processing unit 52 extracts a desired PLP from the T2 frame or the C2 frame from the OFDM demodulation unit 51 in response to an operation or the like of a user and supplies the PLP to the FEC decoding unit 53.

When the third sGSE signaling for T2/C2 is adopted, the frame processing unit 52 extracts the PLP_PAYLOAD_TYPE of the PLP extracted from the T2 frame or the C2 frame from the L1-post signaling included in the T2 frame or the C2 frame and supplies the PLP_PAYLOAD_TYPE to the controller 56.

The FEC decoding unit 53 performs, for example, LDPC decoding or BCH decoding as FEC decoding on an FEC frame by setting the PLP from the frame processing unit 52 as the FEC frame to be subjected to the FEC decoding which is error correction and supplies a consequently obtainable BBF to the stream processing unit 54.

The stream processing unit 54 includes a BB header processing unit 61, an sGSE packet extraction unit 62, a PDU extraction unit 63, a BBF output unit 64, a TS packet extraction unit 65, and a smoothing unit 66. The stream processing unit 54 processes the BBF from the FEC decoding unit 53 and outputs the sGSE packet or the TS packet included in the BBF to the output unit 55 or outputs the BBF from the FEC decoding unit 53 to the output unit 55 without performing any process.

That is, the BBF from the FEC decoding unit 53 is supplied to the BB header processing unit 61.

The BB header processing unit 61 controls a necessary block including the stream processing unit 54 according to the BB header of the BBF from the FEC decoding unit 53.

The BB header processing unit 61 supplies the BBF from the FEC decoding unit 53 to the sGSE packet extraction unit 62, the BBF output unit 64, and the TS packet extraction unit 65.

When the first or second sGSE signaling for T2/C2 is adopted, the BB header processing unit 61 extracts the BB header (BBHEADER) (BB signaling) (FIGS. 11 and 12) and supplies the BB header to the controller 56.

The sGSE packet extraction unit 62 extracts the sGSE packet deployed in the data field of the BBF from the BBF from the BB header processing unit 61 and supplies the sGSE packet to the PDU extraction unit 63.

The PDU extraction unit 63 extracts the PDU (the PDU with a size equal to or less than the restriction size) of the IP packet, the Ethernet packet, or the like deployed in the data field of the sGSE packet from the sGSE packet from the sGSE packet extraction unit 62 and outputs the PDU to the output unit 55.

The BBF output unit 64 outputs the BBF from the BB header processing unit 61 to the output unit 55.

The TS packet extraction unit 65 extracts the TS packet deployed in the data field of the BBF from the BBF from the BB header processing unit 61 and supplies the TS packet to the smoothing unit 66.

The smoothing unit 66 performs smoothing on the TS packet from the TS packet extraction unit 65 and outputs the TS packet to the output unit 55.

The output unit 55 selects and outputs one of the outputs from the PDU extraction unit 63, the BBF output unit 64, and the smoothing unit 66 under the control of the controller 56.

The controller 56 controls each block included in the reception device, as necessary.

For example, the controller 56 identifies the fact that the data field of the BBF supplied from the FEC decoding unit 53 to the stream processing unit 54 is one of the sGSE packet, the TS packet, and the GSE packet (or other data) based on the PLP_PAYLOAD_TYPE from the frame processing unit 52 or the MATYPE-1 of the BB header from the BB header processing unit 61 and controls the output unit 55 based on the identification result.

That is, in the case in which the first sGSE signaling for T2/C2 is adopted, the controller 56 identifies the fact that the data field of the BBF supplied to the stream processing unit 54 is the sGSE packet when the TS/GS of the MATYPE-1 of the BB header from the BB header processing unit 61 is 10 indicating the GSE packet and the EXT is 11 which is the specific value indicating the sGSE packet (FIG. 11).

In the case in which the second sGSE signaling for T2/C2 is adopted, the controller 56 identifies the fact that the data field of the BBF supplied to the stream processing unit 54 is the sGSE packet when the TS/GS of the MATYPE-1 of the BB header from the BB header processing unit 61 is 10 indicating the GSE packet and the NPD is 1 which is a specific value indicating the sGSE packet (FIG. 12).

In the case in which the third sGSE signaling for T2/C2 is adopted, the controller 56 identifies the fact that the data field of the BBF supplied to the stream processing unit 54 is the sGSE packet when the PLP_PAYLOAD_TYPE from the frame processing unit 52 is 00100 which is a specific value indicting the sGSE packet (FIG. 13).

The controller 56 identifies the fact that the data field of the BBF supplied to the stream processing unit 54 is the TS packet when the TS/GS of the MATYPE-1 of the BB header from the BB header processing unit 61 is 11 indicating the TS packet (FIGS. 11 and 12) or the PLP_PAYLOAD_TYPE from the frame processing unit 52 is 00011 indicating the TS packet (FIG. 13).

The controller 56 identifies the fact that the data field of the BBF supplied to the stream processing unit 54 is the GSE packet in any case, i.e., when the TS/GS of the MATYPE-1 of the BB header from the BB header processing unit 61 is 10 indicating the GSE packet and the EXT is a value other than 11 which is a specific value indicating the sGSE packet (FIG. 11), when the TS/GS of the MATYPE-1 is 10 indicating the GSE packet and the NPD is a value other than 1 which is a specific value indicating the sGSE packet (FIG. 12), and when the PLP_PAYLOAD_TYPE from the frame processing unit 52 is 0001 indicating the GSE packet (FIG. 13).

When the controller 56 identifies the fact that the data field of the BBF supplied to the stream processing unit 54 is the sGSE packet, the controller 56 controls the output unit 55 such that the output of the PDU extraction unit 63 is selected in regard to the BBF.

As a result, in regard to the BBF supplied to the stream processing unit 54, the output unit 55 selects and outputs the PDU which is output by the PDU extraction unit 63 and has a size equal to or less than the restriction size deployed in the sGSE packet included in the BBF.

When the controller 56 identifies the fact that the data field of the BBF supplied to the stream processing unit 54 is the TS packet, the controller 56 controls the output unit 55 such that the output of the smoothing unit 66 is selected for the BBF.

As a result, in regard to the BBF supplied to the stream processing unit 54, the output unit 55 selects and outputs the TS packet output by the smoothing unit 66 and included in the BBF.

When the controller 56 identifies the fact that the data field of the BBF supplied to the stream processing unit 54 is the GSE packet, the controller 56 controls the output unit 55 such that the output of the BBF output unit 64 is selected in regard to the BBF.

As a result, in regard to the BBF supplied to the stream processing unit 54, the output unit 55 selects and outputs the BBF itself output by the BBF output unit 64.

The OFDM demodulation unit 51 to the controller 56 described above can be configured as a demodulation LSI which is an LSI of one chip.

As described above, in the reception device, whether the data field of the BBF is the sGSE packet can be easily identified based on the TS/GS and the EXT of the MATYPE-1, the TS/GS and the NPD, or the PLP_PAYLOAD_TYPE of the BB header as the sGSE signaling.

In the reception device, when the data field of the BBF is the GSE packet, the BBF is output to the outside without change. Therefore, the process on the BBF can be committed to the outside. Accordingly, the backward compatibility can be ensured for the GSE packet and the process can thus be performed flexibly.

Figure 15:
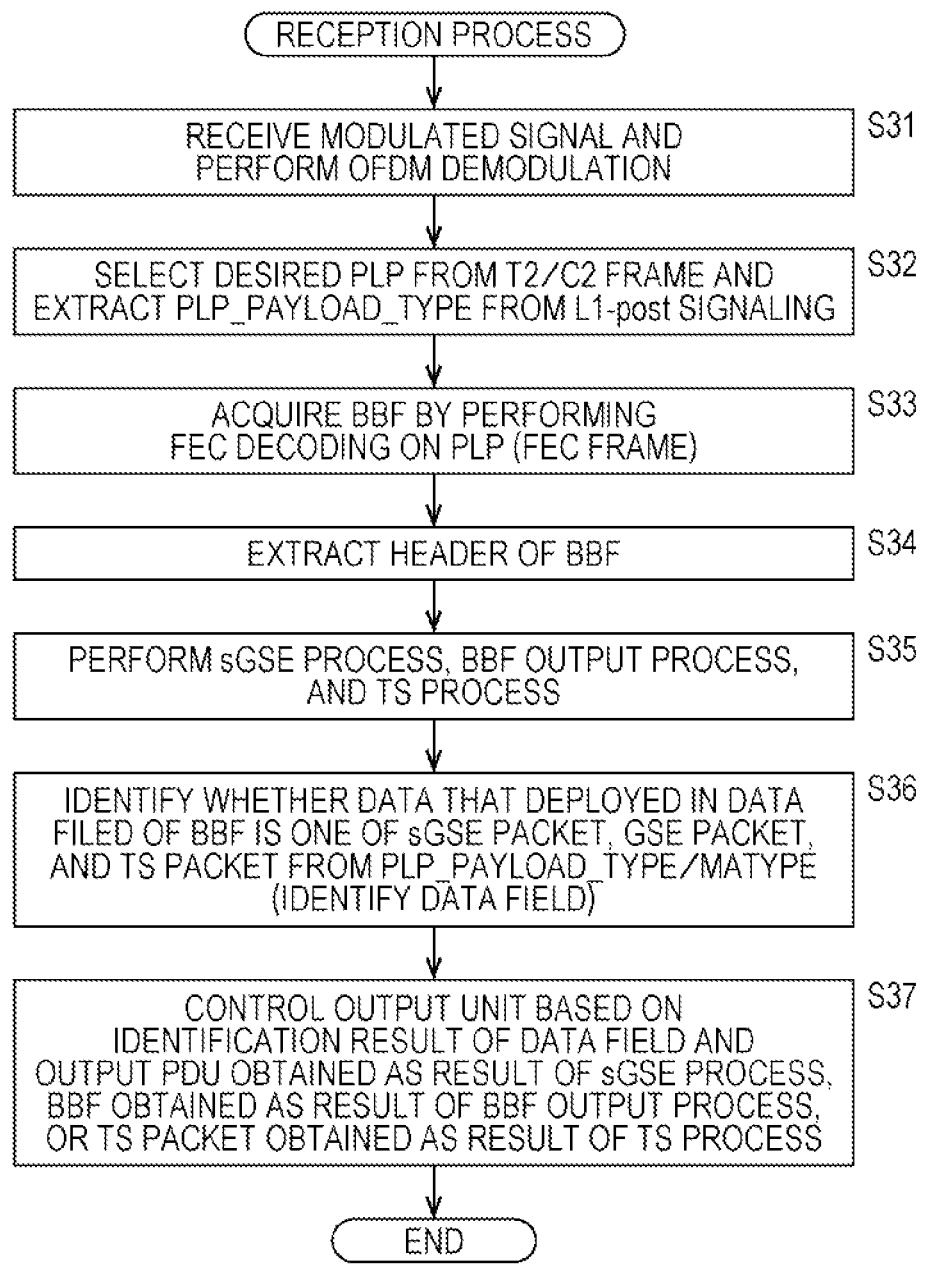
FIG. 15 is a flowchart for describing a process (reception process) of the reception device.

FIG. 15 is a flowchart for describing a process (reception process) of the reception device in FIG. 14.

In step S31, the OFDM demodulation unit 51 receives the modulated signal transmitted from the transmission device in FIG. 9, performs the OFDM demodulation, and supplies the consequently obtainable T2 frame or C2 frame to the frame processing unit 52, and then the process proceeds to step S32.

In step S32, for example, the frame processing unit 52 extracts the desired PLP from the T2 frame or the C2 frame from the OFDM demodulation unit 51 in response to an operation or the like of the user and supplies the PLP to the FEC decoding unit 53.

The frame processing unit 52 extracts the PLP_PAYLOAD_TYPE of the PLP extracted from the T2 frame or the C2 frame from the L1-post signaling included in the T2 frame or the C2 frame, and supplies the PLP_PAYLOAD_TYPE to the controller 56, and then the process proceeds from step S32 to step S33.

In step S33, the FEC decoding unit 53 performs the FEC decoding using the PLP from the frame processing unit 52 as the FEC frame and supplies the consequently obtainable BBF to the stream processing unit 54, and then the process proceeds to step S34.

In step S34, the BB header processing unit 61 of the stream processing unit 54 extracts the BB header (FIGS. 11 and 12) from the BBF from the FEC decoding unit 53 and supplies the BB header to the controller 56.

Further, the BB header processing unit 61 supplies the BBF from the FEC decoding unit 53 to the sGSE packet extraction unit 62, the BBF output unit 64, and the TS packet extraction unit 65, and then the process proceeds from step S34 to step S35.

In step S35, an sGSE process, a BBF output process, and a TS process are performed, and then the process proceeds to step S36.

Here, in the sGSE process, the sGSE packet extraction unit 62 extracts the sGSE packet from the BBF on the assumption that the sGSE packet is included in the BBF from the BB header processing unit 61 and supplies the sGSE packet to the PDU extraction unit 63. The PDU extraction unit 63 extracts the PDU from the sGSE packet from the sGSE packet extraction unit 62 and outputs the PDU to the output unit 55.

In the BBF output process, the BBF output unit 64 outputs the BBF from the BB header processing unit 61 to the output unit 55.

In the TS process, the TS packet extraction unit 65 extracts the TS packet from the BBF on the assumption that the TS packet is included in the BBF from the BB header processing unit 61 and supplies the TS packet to the smoothing unit 66. The smoothing unit 66 performs the smoothing on the TS packet from the TS packet extraction unit 65 and outputs the TS packet to the output unit 55.

In step S36, the controller 56 performs the identification of the data field to identify the fact that the data field of the BBF supplied immediately previously from the FEC decoding unit 53 to the stream processing unit 54 is one of the sGSE packet, the TS packet, and the GSE packet based on the PLP_PAYLOAD_TYPE from the frame processing unit 52 or the MATYPE-1 of the BB header from the BB header processing unit 61 as the sGSE signaling, and then the process proceeds to step S37.

In step S37, the controller 56 controls the output unit 55 based on the identification result obtained by identifying the data field in step S36 such that the output unit 55 accordingly selects and outputs one of the outputs of the PDU extraction unit 63, the BBF output unit 64, and the smoothing unit 66, and then the reception process ends.

That is, the output unit 55 selects and outputs the PDU which is output by the PDU extraction unit 63 and can be obtained as the result of the sGSE process, the BBF which is output by the BBF output unit 64 and can be obtained as the result of the BBF output process, or the TS packet which is output by the smoothing unit 66 and can be obtained as the result of the TS process under the control of the controller 56.

The reception process in FIG. 15 is repeatedly performed with a pipeline.

In FIG. 15, the sGSE process, the BBF output process, and the TS process are all performed in step S35. Thereafter, in step S36, the identification of the data field is performed to identify the fact that the data field of the BBF is one of the sGSE packet, the TS packet, and the GSE packet based on the PLP_PAYLOAD_TYPE or the MATYPE-1 as the sGSE signaling. However, the identification of the data field can be performed first and only one of the sGSE process, the BBF output process, and the TS process can be performed based on the identification result.

That is, when the fact that the data field of the BBF is the sGSE packet is identified as the result of the identification of the data field, only the sGSE process can be performed among the sGSE process, the BBF output process, and the TS process.

Likewise, when the fact that the data field of the BBF is the GSE packet is identified as the result of the identification of the data field, only the BBF output process can be performed. When the fact that the data field of the BBF is the TS packet is identified, only the TS process can be performed.

<Another Embodiment of Transmission Device to which the Present Technology is Applied>

Figure 16:
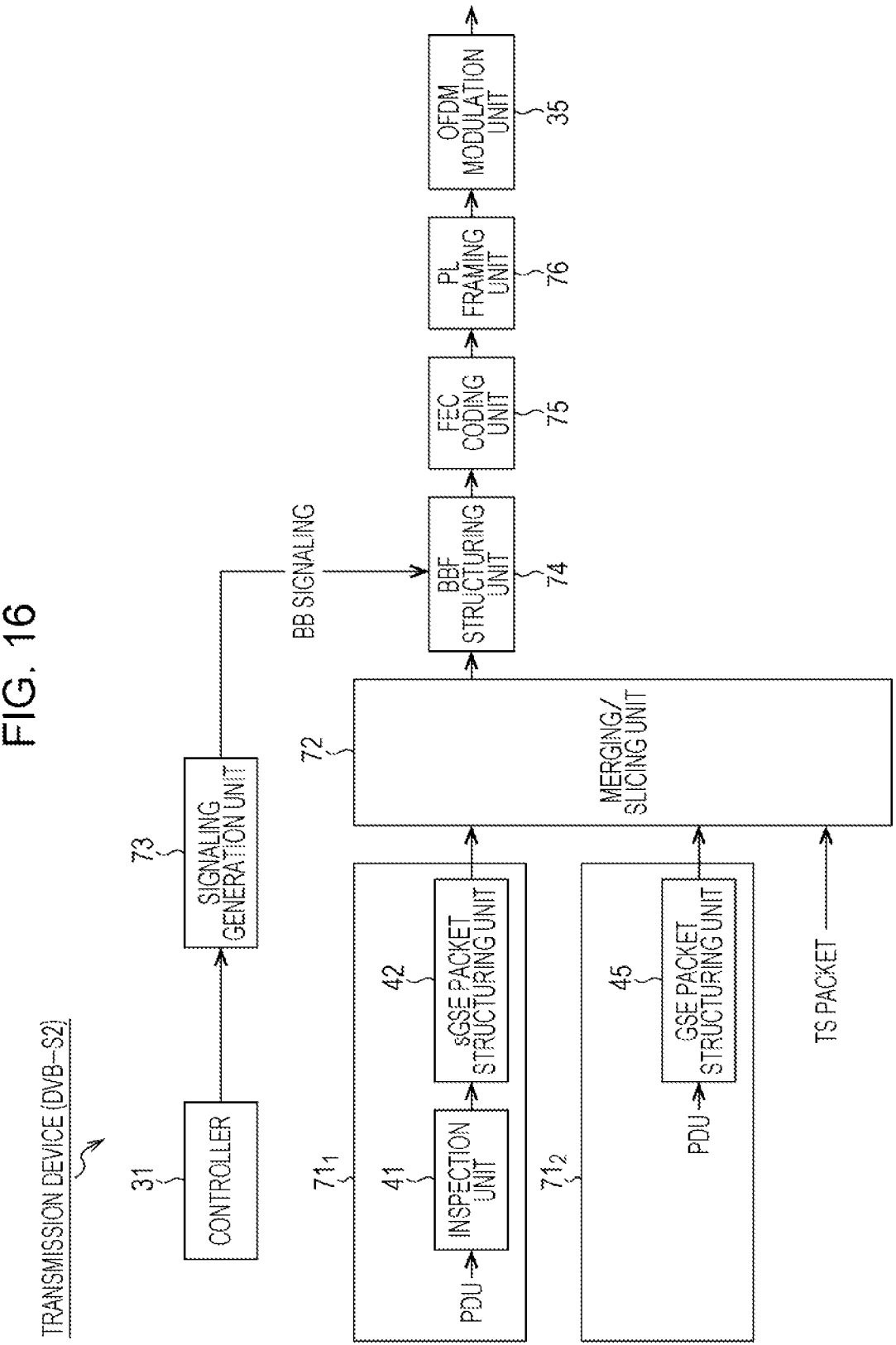
FIG. 16 is a block diagram illustrating an example of the configuration of the transmission device of another embodiment to which the present technology is applied.

FIG. 16 is a block diagram illustrating an example of the configuration of a data processing device serving as a transmission device of another embodiment to which the present technology is applied.

The same reference numerals are given to elements corresponding to those in the case of FIG. 9 and the description thereof will be appropriately omitted below.

In FIG. 16, the transmission device includes a controller 31, an OFDM modulation unit 35, data structuring units $71_1$ and $71_2$, a merging/slicing unit 72, a signaling generation unit 73, a BBF structuring unit 74, an FEC coding unit 75, and a PL (Physical Layer) framing unit 76 and performs broadcast in conformity with, for example, the DVB-S2.

The data structuring unit $71_1$ includes an inspection unit 41 and an sGSE packet structuring unit 42, structures an sGSE packet, and supplies the sGSE packet to the merging/slicing unit 72.

That is, a PDU is supplied to the inspection unit 41. Then, as in the case of FIG. 9, the inspection unit 41 checks (inspects) whether the size of the PDU supplied to the inspection unit 41 is equal to or less than a restriction size determined in advance and supplies the PDU with the size equal to or less than the restriction size to the sGSE packet structuring unit 42.

As in the case of FIG. 9, the sGSE packet structuring unit 42 structures an sGSE packet which is a GSE packet in which the PDU from the inspection unit 41 is deployed in the data field and supplies the sGSE packet to the merging/slicing unit 72.

As in the case of FIG. 9, when it is ensured that the maximum size of the PDU supplied to the data structuring unit $71_1$ is restricted to the restriction size by any method, the data structuring unit $71_1$ can be configured excluding the inspection unit 41.

The data structuring unit $71_2$ includes a GSE packet structuring unit 45, structures a GSE packet, and supplies the GSE packet to the merging/slicing unit 72.

That is, the PDU is supplied to the GSE packet structuring unit 45. Then, the GSE packet structuring unit 45 structures the GSE packet in which the PDU is deployed in the data field and supplies the GSE packet to the merging/slicing unit 72.

As described above, the data structuring unit $71_1$ supplies the merging/slicing unit 72 with the sGSE packet and the data structuring unit $71_2$ supplies the merging/slicing unit 72 with the GSE packet. Further, the merging/slicing unit 72 is supplied with the TS packet from the outside.

The merging/slicing unit 72 merges and slices the supplied sGSE packet, GSE packet, or TS packet, as necessary, and supplies the sGSE packet, the GSE packet, or the TS packet to the BBF structuring unit 74.

The signaling generation unit 73 generates BB signaling suitable for data transmitted from the transmission device under the control of the controller 31 and supplies the BB signaling to the BBF structuring unit 74.

The BBF structuring unit 74 deploys the sGSE packet, the GSE packet, or the TS packet supplied from the merging/slicing unit 72 in the data field, structures a BBF in which the BB signaling from the signaling generation unit 73 is deployed in the BB header, and supplies the BBF to the FEC coding unit 75.

The FEC coding unit 75 performs FEC coding on the BBF from the BBF structuring unit 74, as in the FEC coding unit 44, 47, or 49 in FIG. 9, and supplies an FEC frame (FECFRAME) which is an FEC code of the BBF obtainable as the result of the FEC coding to the PL framing unit 76.

The PL framing unit 76 structures a PL frame (PL-FRAME) of the DVB-S2 including the FEC frame from the FEC coding unit 75 and supplies the PL frame to the OFDM modulation unit 35.

In the DVB-S2, FEC codes with different parameters (for example, a coding ratio or the like of the LDPC code as the FEC code) can be used in units of PL frames.

In the transmission device in FIG. 16, only one data structuring unit $71_1$ is installed as the data structuring unit that structures the sGSE packet. However, a plurality of data structuring units that structure the sGSE packets can be provided. The same also applies to the data structuring unit that structures the GSE packet.

In FIG. 16, the TS packet (stream of the TS packet) of one system is supplied to the merging/slicing unit 72, but TS packets of a plurality of systems can be supplied to the merging/slicing unit 72.

In the reception device in FIG. 16, it is not essential that the data structuring unit $71_2$ that structures the GSE packet is provided or the TS packet is supplied to the merging/slicing unit 72.

Figure 17:
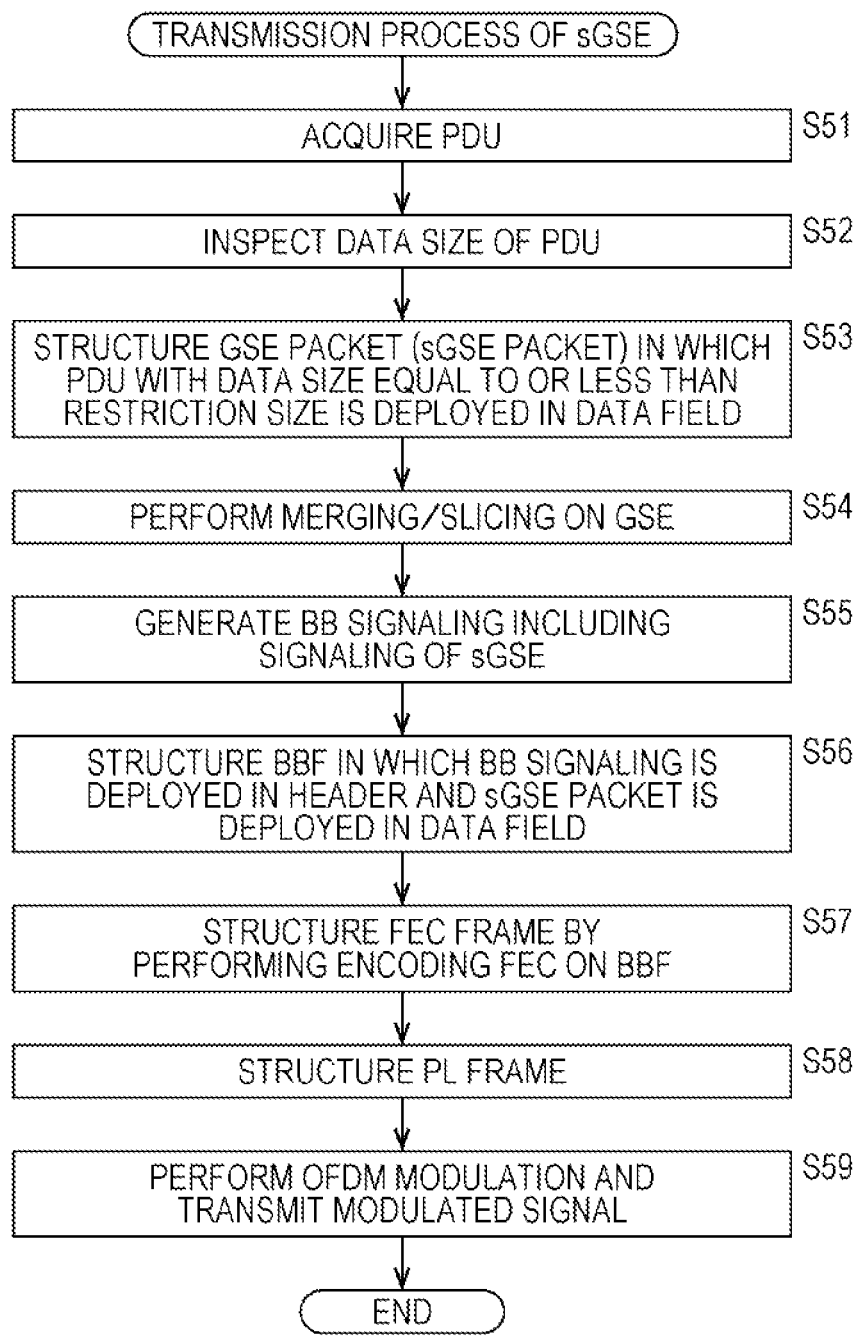
FIG. 17 is a flowchart for describing a process (sGSE transmission process) of the transmission device transmitting an sGSE packet.

FIG. 17 is a flowchart for describing a process (sGSE transmission process) of the transmission device in FIG. 16 when the sGSE packet (a modulated signal including the sGSE packet) is transmitted.

In step S51, the inspection unit 41 acquires the PDU included in the sGSE packet and the process proceeds to step S52.

In step S52, the inspection unit 41 checks (inspects) the size of the PDU.

When the inspection unit 41 confirms that the size of the PDU is not equal to or less than the restriction size as the result of the checking of the size of the PDU, the inspection unit 41 performs a predetermined error process and the sGSE transmission process ends.

Conversely, when the inspection unit 41 confirms that the size of the PDU is equal to or less than the restriction size, the inspection unit 41 supplies the PDU to the sGSE packet structuring unit 42 and the process proceeds from step S52 to step S53.

In step S53, the sGSE packet structuring unit 42 structures the sGSE packet which is the GSE packet in which the PDU from the inspection unit 41, i.e., the PDU of which the maximum size is restricted to the restriction size, is deployed in the data field and supplies the sGSE packet to the merging/slicing unit 72, and then the process proceeds to step S54.

In step S54, the merging/slicing unit 72 merges or slices the sGSE packet from the sGSE packet structuring unit 42, as necessary, and supplies the sGSE packet to the BBF structuring unit 74, and then the process proceeds to step S55.

In step S55, the signaling generation unit 73 generates the BB signaling including necessary sGSE signaling under the control of the controller 31 and supplies the BB signaling to the BBF structuring unit 74, and then the process proceeds to step S56.

In step S56, the BBF structuring unit 74 structures the BBF in which the sGSE packet from the merging/slicing unit 72 is deployed in the data field and the BB signaling from the signaling generation unit 73 is deployed in the BB header and supplies the BBF to the FEC coding unit 75, and then the process proceeds to step S57.

In step S57, the FEC coding unit 75 performs the FEC coding on the BBF from the BBF structuring unit 74 and supplies the consequently obtainable FEC frame to the PL framing unit 76, and then the process proceeds to step S58.

In step S58, the PL framing unit 76 structures the PL frame by adding a PL header to the FEC frame from the FEC coding unit 75 and supplies the PL frame to the OFDM modulation unit 35, and then the process proceeds to step S59.

In step S59, the OFDM modulation unit 35 performs OFDM modulation on the PL frame from the PL framing unit 76 and transmits the consequently obtainable modulated signal, and then the sGSE transmission process ends.

The sGSE transmission process in FIG. 17 is repeatedly performed with a pipeline.

The merging/slicing unit 72 is supplied not only with the sGSE packet from the sGSE packet structuring unit 42, but is also supplied with the GSE packet from the GSE packet structuring unit 45 or is supplied with the TS packet from the outside.

When the GSE packet or the TS packet is supplied, the merging/slicing unit 72 merges or slices the GSE packet or the TS packet, as necessary, and supplies the GSE packet or the TS packet to the BBF structuring unit 74.

Thereafter, by performing the same process as the case of the supply of the sGSE packet from the sGSE packet structuring unit 42 to the merging/slicing unit 72, the PL frame including the GSE packet or the TS packet is accordingly structured and transmitted.

<sGSE Signaling in DVB-S2>

Figure 18:
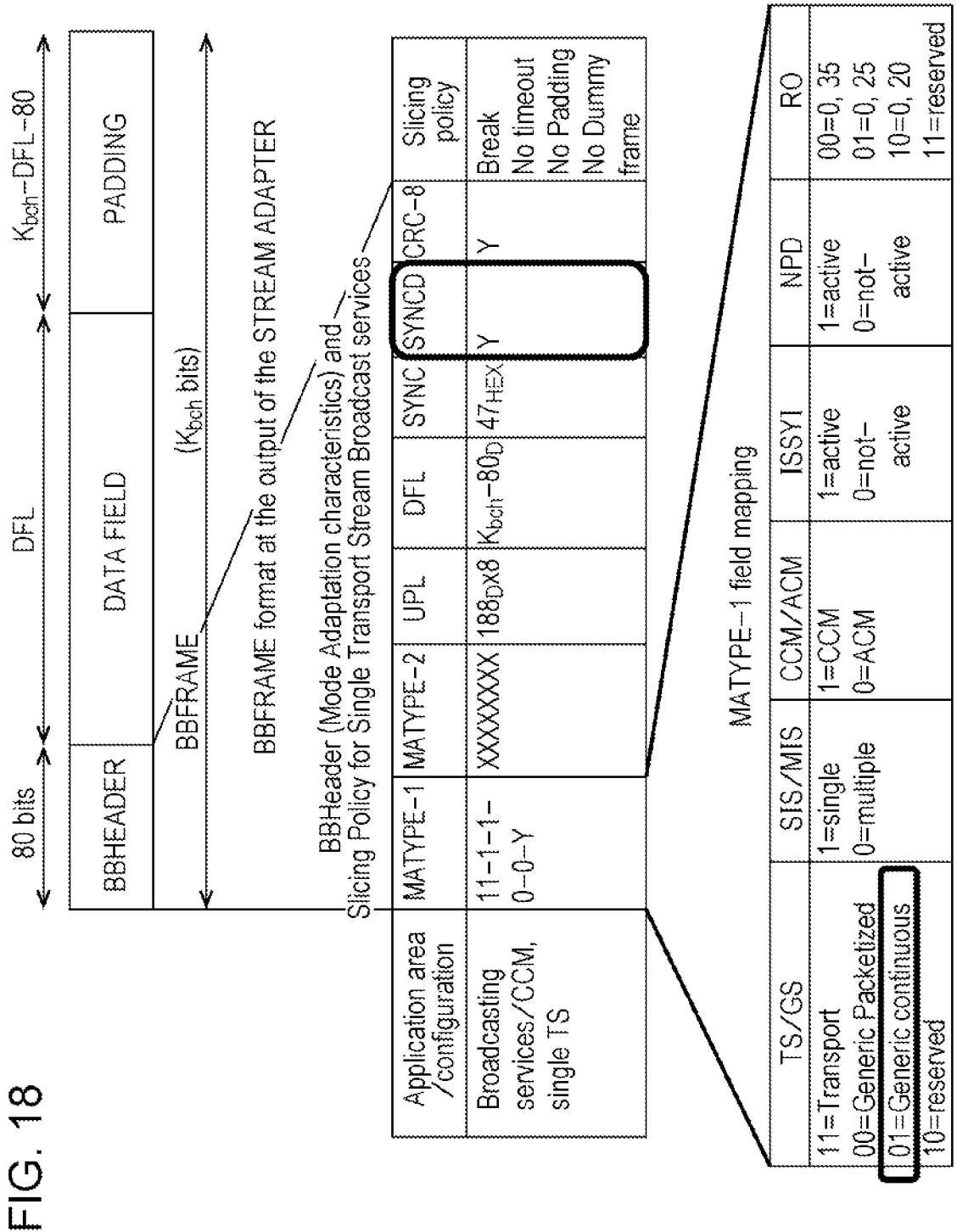
FIG. 18 is a diagram for describing a first example of sGSE signaling used in a DVB-S2.

FIG. 18 is a diagram for describing a first example (hereinafter also referred to as first sGSE signaling for S2) of the sGSE signaling used with the DVB-S2, i.e., the sGSE signaling when the transmission device in FIG. 16 transmits the sGSE packet.

FIG. 18 illustrates a BBF (BBFRAME) used with the present DVB-S2 (ETSI EN 302 307 V1.2.1 (2009-08)).

The BBF used with the DVB-S2 includes a BB header (BBHEADER), a data field (DATAFIELD), and necessary padding (PADDING).

The BB header of the BBF used with the DVB-S2 has 80-bit data and is structured such that a 1-byte MATYPE-1, a 1-byte MATYPE-2, a 2-byte UPL, a 2-byte DFL, a 1-byte SYNC, a 2-byte SYNCD, and a 1-byte CRC-8 are arranged side by side in this order.

In the 1-byte MATYPE-1 of the beginning of the BB header, a 2-bit TS/GS, a 1-bit SIS/MIS, a 1-bit CCM/ACM, a 1-bit ISSYI, a 1-bit NPD, and a 2-bit RO are allocated in this order.

In the DVB-S2, when the TS packet is included in the BBF (when the TS packet is deployed in the data field of the BBF), the TS/GS is set to 11 (binary numbers).

Here, setting of the TS/GS is not defined in the DVB-S2 when the GSE packet is included in the BBF.

However, an implementation guideline (ETSI TS 102 771 V1.2.1 (2011-05)) of the DVB-GSE describes that GSE packets are transmitted as generic continuous streams at the present DVB-S2.

Thus, in the DVB-S2, the TS/GS can be set to 01 when the sGSE packet which is the GSE packet or the GSE packet is included in the BBF.

In the present DVB-S2, the SYNCD is unused when the TS/GS is set to 01.

Thus, in the sGSE signaling, for example, the TS/GS and the SYNCD can be used.

That is, it is possible to adopt, for example, a method of setting the TS/GS to 01 and setting the SYNCD to FFFF or the like (hexadecimal numbers) as a specific value as the sGSE signaling.

According to the sGSE signaling, when the TS/GS is set to 01 and the SYNCD is set to the FFFF which is the specific value, the fact that the data field (data of the data field) of the BBF is the sGSE packet can be identified.

In the signaling used to identify the fact that data is the GSE packet, the TS/GS is set to 01 and the SYNCD is set to a value other than FFFF which is the specific value used for the sGSE signaling. For example, it is possible to adopt a method of setting 0000 or the like.

Figure 19:
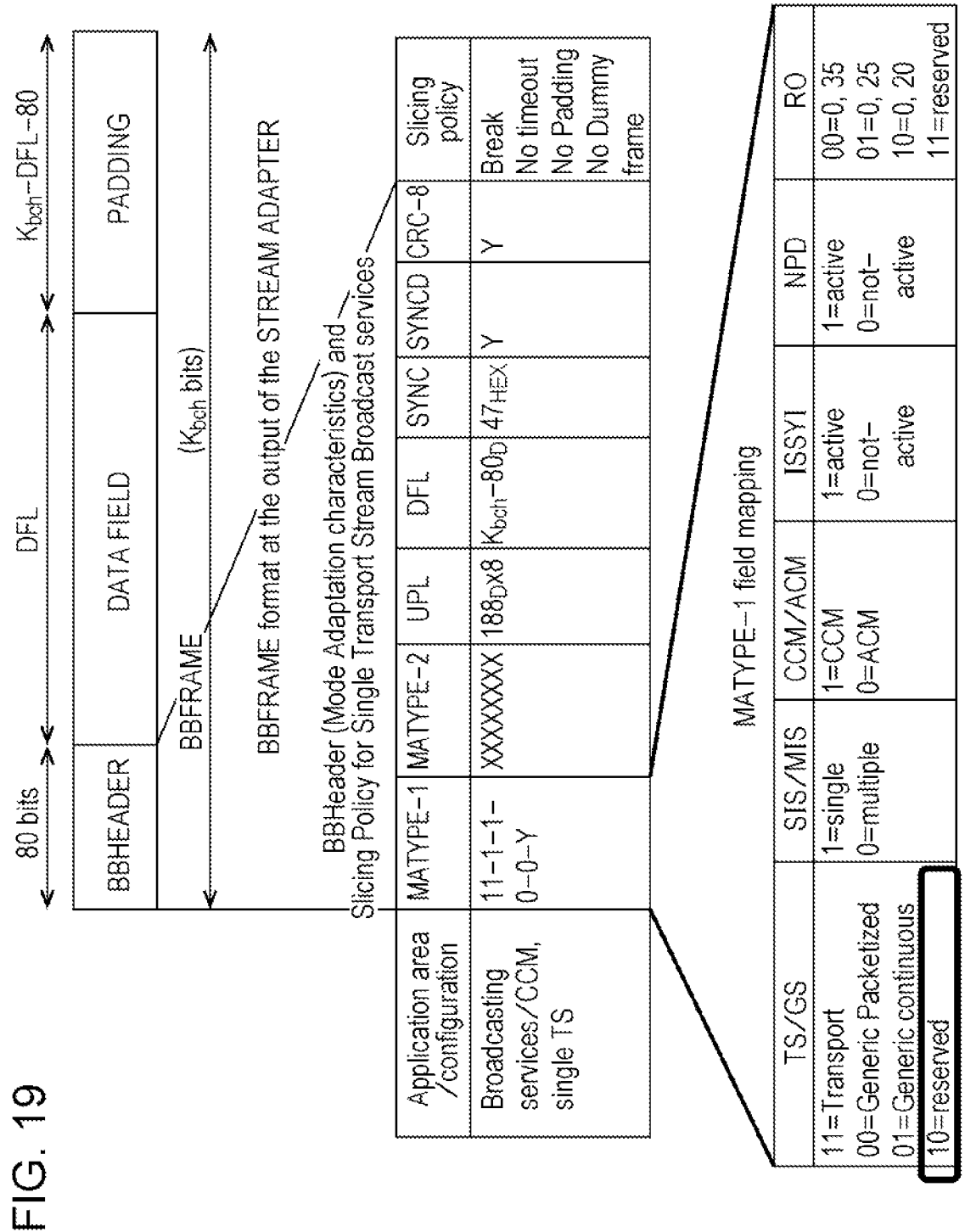
FIG. 19 is a diagram for describing a second example of sGSE signaling used in the DVB-S2.

FIG. 19 is a diagram for describing a second example (hereinafter also referred to as second sGSE signaling for S2) of the sGSE signaling used with the DVB-S2.

That is, FIG. 19 illustrates the BBF used with the DVB-S2, as in FIG. 18.

As described with reference to FIG. 18, the 2-bit TS/GS is included in the 1-byte MATYPE-1 at the beginning of the BB header. In the present DVB-S2, 10 is set to be unused for the 2-bit TS/GS.

Accordingly, in the sGSE signaling, it is possible to adopt a method of setting the TS/GS to 10 which is unused.

According to the sGSE signaling, when the TS/GS is set to 10, the fact that the data field of the BBF is the sGSE packet can be identified.

In the signaling used to identify the fact that data is the GSE packet, it is possible to adopt, for example, a method of setting the TS/GS to 01 and setting the SYNCD to 0000, as in the case of FIG. 18.

Figure 20:
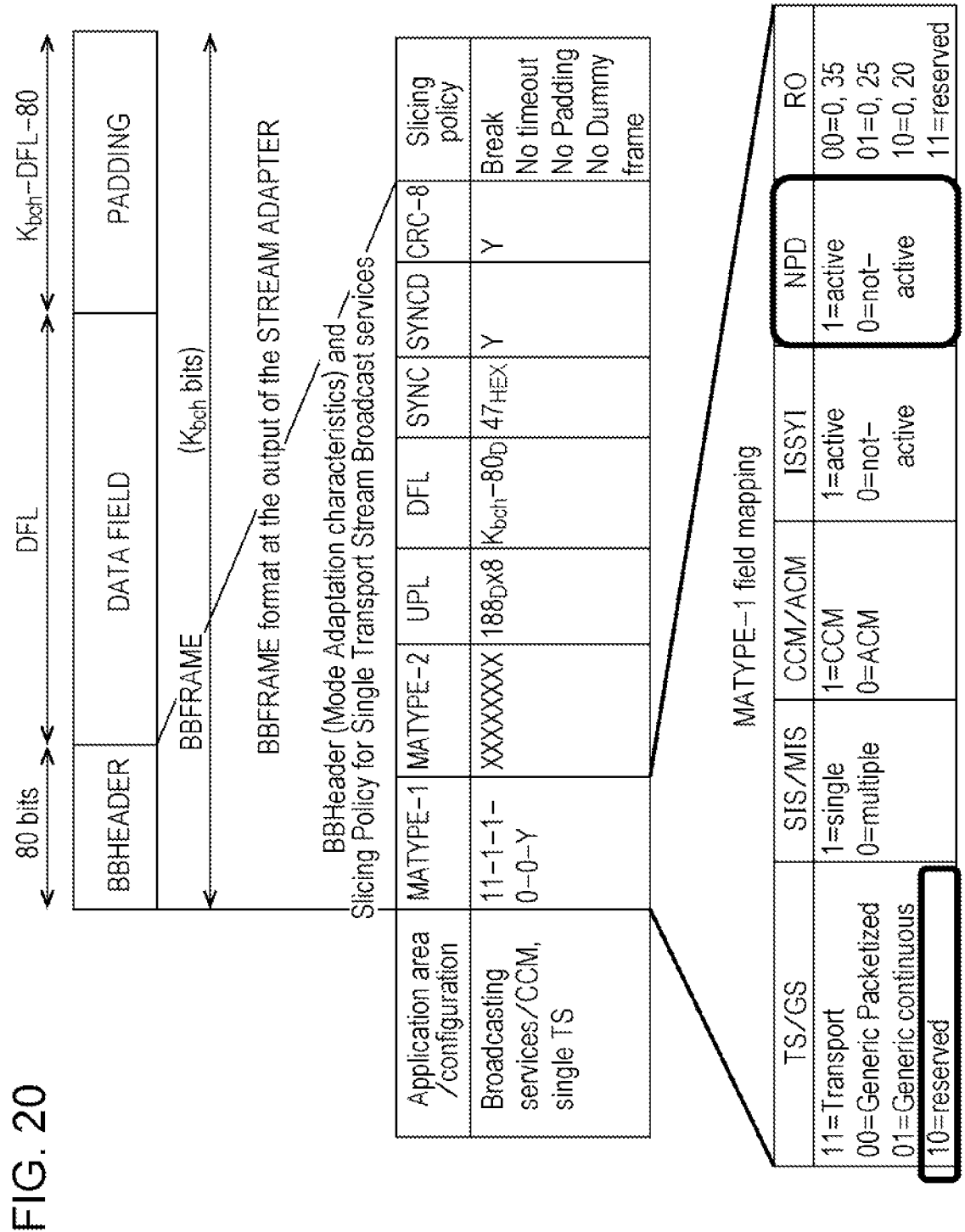
FIG. 20 is a diagram for describing a third example of sGSE signaling used in the DVB-S2.

FIG. 20 is a diagram for describing a third example (hereinafter also referred to as third sGSE signaling for S2) of the sGSE signaling used with the DVB-S2.

That is, FIG. 20 illustrates the BBF used with the DVB-S2, as in FIG. 18.

As described with reference to FIG. 18, the 2-bit TS/GS and the 1-bit NPD are included in the 1-byte MATYPE-1 at the beginning of the BB header.

As described with reference to FIG. 19, in the present DVB-S2, 10 is unused for the 2-bit TS/GS. Further, when the TS/GS is set to 10 which is unused, the NPD does not function (the NPD functions when the TS packet is included in the BBF) in the present DVB-S2.

Accordingly, in the sGSE signaling and the signaling used to identify the fact that data is the GSE packet, the TS/GS and the NPD can be used.

That is, when the data field of the BBF is the GSE packet or the sGSE packet, the TS/GS is set to 10. The NPD can be set depending on whether the data field of the BBF is one of the GSE packet and the sGSE packet.

Specifically, for example, when the data field of the BBF is the GSE packet, the NPD can be set to 0. When the data field of the BBF is the sGSE packet, the NPD can be set to 1.

According to the sGSE signaling, when the TS/GS is set to 10 and the NPD is set to 1, the fact that the data field of the BBF is the sGSE packet can be identified.

When the TS/GS is set to 10 and the NPD is set to 0, the fact that the GSE packet is the data field of the BBF can be identified.

In the transmission device in FIG. 16, the signaling generation unit 73 generates the BB signaling including the above-described sGSE signaling in regard to the BBF which is structured by the BBF structuring unit 74 and includes the sGSE packet.

As described above, by generating the sGSE signaling, including the sGSE signaling in the BB header, and transmitting the sGSE signaling as the PL frame together with the sGSE packet deployed in the data field of the BBF, a reception device receiving the PL frame can easily identify whether the data field of the BBF included in the PL frame is the sGSE packet based on the sGSE signaling.

That is, whether the data field of the BBF is the sGSE packet can be identified without mounting complicated rules or logics analyzing the data field of the BBF on the reception device to identify the fact that the data field of the BBF is the sGSE packet.

<Another Embodiment of Reception Device to which the Present Technology is Applied>

Figure 21:
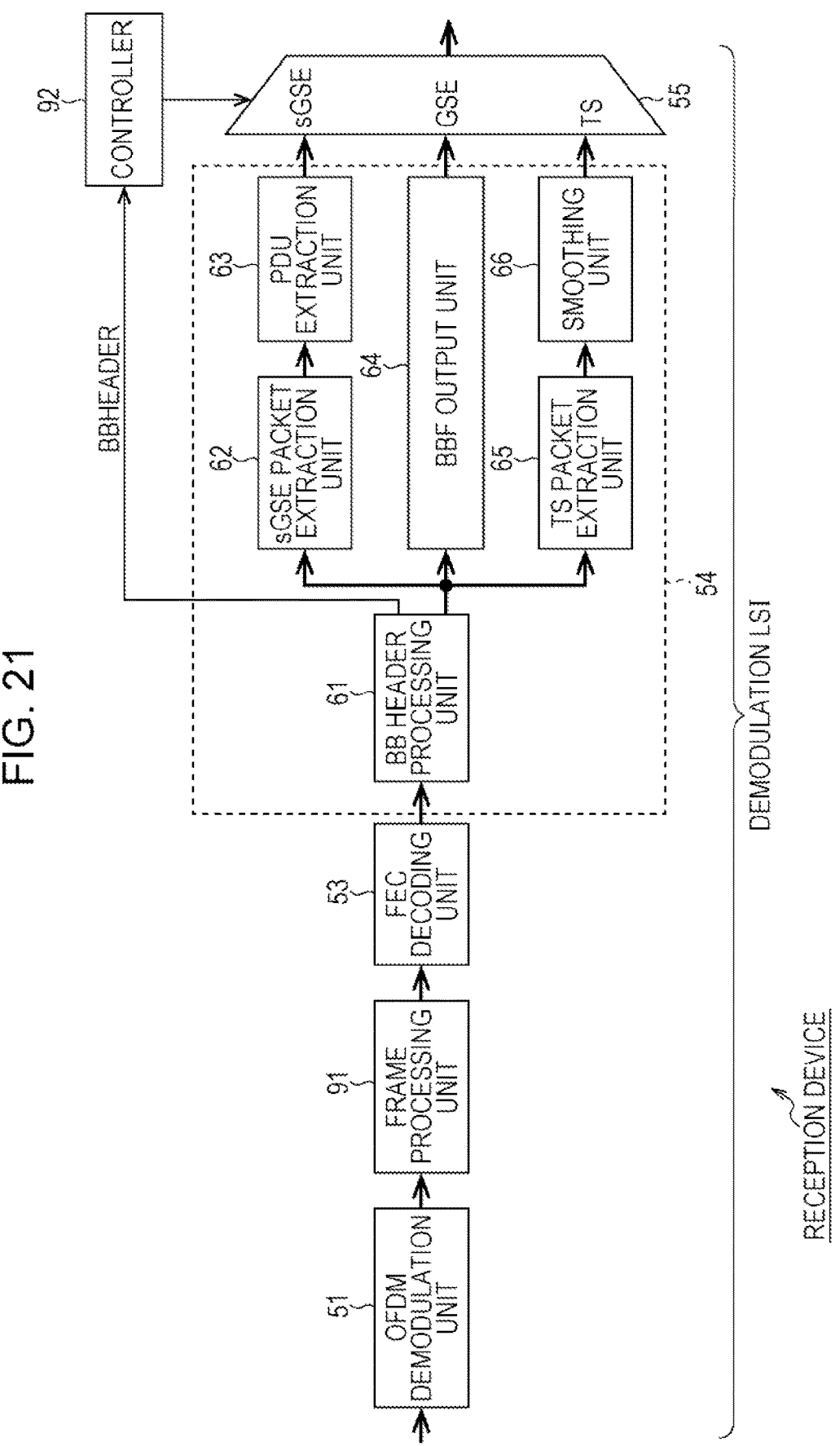
FIG. 21 is a block diagram illustrating an example of the configuration of the reception device of another embodiment to which the present technology is applied.

FIG. 21 is a block diagram illustrating an example of the configuration of a data processing device serving as a reception device of another embodiment to which the present technology is applied.

The same reference numerals are given to elements corresponding to those in the case of FIG. 14 and the description thereof will be appropriately omitted below.

The reception device in FIG. 21 is in common with the case of FIG. 14 in that the reception device includes an OFDM demodulation unit 51, an FEC decoding unit 53, a stream processing unit 54, and an output unit 55.

However, the reception device in FIG. 21 is different from the case of FIG. 14 in that a frame processing unit 91 is included instead of the frame processing unit 52 and a controller 92 is included instead of the controller 56.

The reception device in FIG. 21 receives broadcast conforming to the DVB-S2, i.e., a modulated signal transmitted from the transmission device in FIG. 16.

In FIG. 21, the OFDM demodulation unit 51 supplies the frame processing unit 91 with a demodulation result of the modulated signal transmitted from the transmission device in FIG. 16.

That is, the OFDM demodulation unit 51 receives the modulated signal transmitted from the transmission device in FIG. 16, performs OFDM demodulation, and supplies a PL frame (a series of PL frames) obtainable as the demodulation result to the frame processing unit 52.

For example, the frame processing unit 52 extracts a desired PL frame supplied from the PL frame supplied from the OFDM demodulation unit 51 in response to an operation or the like of a user and supplies the PL frame to the FEC decoding unit 53.

The FEC decoding unit 53 performs FEC decoding by setting the FEC frame included in the PL frame from the frame processing unit 52 as a target.

The BB header processing unit 61 supplies the controller 92 with the BB header (FIGS. 18 to 20).

That is, the BB header processing unit 61 extracts the BB header (BB signaling) (FIGS. 18 to 20) and supplies the BB header to the controller 92.

The controller 92 controls each block included in the reception device, as necessary.

For example, the controller 92 identifies the fact that the data field of the BBF supplied from the FEC decoding unit 53 to the stream processing unit 54 is one of the sGSE packet, the TS packet, and the GSE packet based on the BB header (BB signaling) from the BB header processing unit 61 and controls the output unit 55 based on the identification result.

That is, in the case in which the first sGSE signaling for S2 is adopted (FIG. 18), the controller 92 identifies the fact that the data field of the BBF supplied to the stream processing unit 54 is the sGSE packet when the TS/GS of the MATYPE-1 of the BB header from the BB header processing unit 61 is 01 indicating the generic continuous stream and the SYNCD of the BB header is FFFF which is the specific value indicating the sGSE packet.

In the case in which the second sGSE signaling for S2 is adopted (FIG. 19), the controller 92 identifies the fact that the data field of the BBF supplied to the stream processing unit 54 is the sGSE packet when the TS/GS of the MATYPE-1 of the BB header from the BB header processing unit 61 is 10 indicating the sGSE packet.

Even in the case in which one of the first sGSE signaling and the second sGSE signaling for S2 is adopted (FIGS. 18 and 19), the controller 92 identifies the fact that the data field of the BBF supplied to the stream processing unit 54 is the sGSE packet when the TS/GS of the MATYPE-1 of the BB header from the BB header processing unit 61 is 01 indicating the generic continuous stream and the SYNCD of the BB header is 0000 (which is a value indicating the sGSE packet).

In the case in which the third sGSE signaling for S2 is adopted (FIG. 20), the controller 92 identifies the fact that the data field of the BBF supplied to the stream processing unit 54 is the sGSE packet when the TS/GS of the MATYPE-1 of the BB header from the BB header processing unit 61 is 10 indicating the GSE packet and the NPD is 1 which is the specific value indicating the sGSE packet.

Further, in the case in which the third sGSE signaling for S2 is adopted, the controller 92 identifies the fact that the data field of the BBF supplied to the stream processing unit 54 is the GSE packet when the TS/GS of the MATYPE-1 of the BB header from the BB header processing unit 61 is 10 indicating the GSE packet and the NPD is 0 which is the specific value indicating the GSE packet.

Even in the case in which one of the first sGSE signaling to the third sGSE signaling for S2 is adopted (FIGS. 18 to 20), the controller 92 identifies the fact that the data field of the BBF supplied to the stream processing unit 54 is the TS packet when the TS/GS of the MATYPE-1 of the BB header from the BB header processing unit 61 is 11 indicating the TS packet.

When the controller 92 identifies the fact that the data field of the BBF supplied to the stream processing unit 54 is the sGSE packet, the controller 92 controls the output unit 55 such that the output of the PDU extraction unit 63 is selected in regard to the BBF.

As a result, in regard to the BBF supplied to the stream processing unit 54, the output unit 55 selects and outputs the PDU which is output by the PDU extraction unit 63 and has a size equal to or less than the restriction size deployed in the sGSE packet included in the BBF.

When the controller 92 identifies the fact that the data field of the BBF supplied to the stream processing unit 54 is the TS packet, the controller 92 controls the output unit 55 such that the output of the smoothing unit 66 is selected for the BBF.

As a result, in regard to the BBF supplied to the stream processing unit 54, the output unit 55 selects and outputs the TS packet output by the smoothing unit 66 and included in the BBF.

When the controller 92 identifies the fact that the data field of the BBF supplied to the stream processing unit 54 is the GSE packet, the controller 92 controls the output unit 55 such that the output of the BBF output unit 64 is selected in regard to the BBF.

As a result, in regard to the BBF supplied to the stream processing unit 54, the output unit 55 selects and outputs the BBF itself output by the BBF output unit 64.

The OFDM demodulation unit 51, the FEC decoding unit 53, the stream processing unit 54, the output unit 55, the frame processing unit 91, and the controller 92 in FIG. 21 can be configured as a demodulation LSI which is an LSI of one chip, as in the case of FIG. 14.

As described above, in the reception device in FIG. 21, whether the data field of the BBF is the sGSE packet can be easily identified based on the TS/GS and the SYNCD of the MATYPE-1, the TS/GS, or the TS/GS and the NPD as the sGSE signaling.

Figure 22:
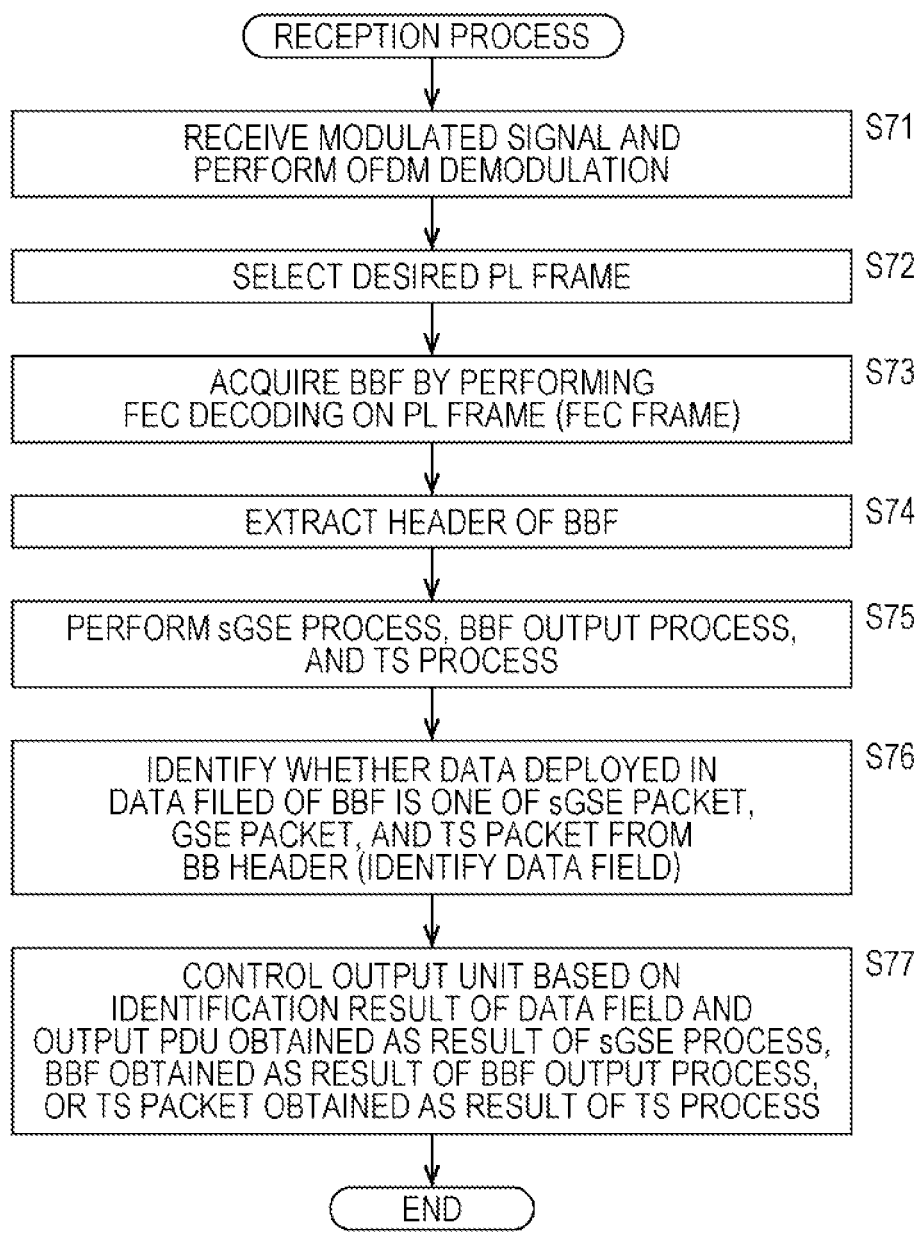
FIG. 22 is a flowchart for describing a process (reception device) of the reception device.

FIG. 22 is a flowchart for describing a process (reception process) of the reception device in FIG. 21.

In step S71, the OFDM demodulation unit 51 receives the modulated signal transmitted from the transmission device in FIG. 16, performs the OFDM demodulation, and supplies the consequently obtainable PL frame to the frame processing unit 91, and then the process proceeds to step S72.

In step S72, for example, the frame processing unit 91 extracts the desired PL frame from the PL frame from the OFDM demodulation unit 51 in response to an operation or the like of the user and supplies the PL frame to the FEC decoding unit 53, and then the process proceeds to step S73.

In step S73, the FEC decoding unit 53 performs the FEC decoding on the FEC frame included in the PL frame from the frame processing unit 52 and supplies the consequently obtainable BBF to the stream processing unit 54, and then the process proceeds to step S74.

In step S74, the BB header processing unit 61 of the stream processing unit 54 extracts the BB header (FIGS. 18 to 20) from the BBF from the FEC decoding unit 53 and supplies the BB header to the controller 92.

Further, the BB header processing unit 61 supplies the BBF from the FEC decoding unit 53 to the sGSE packet extraction unit 62, the BBF output unit 64, and the TS packet extraction unit 65, and then the process proceeds from step S74 to step S75.

In step S75, an sGSE process, a BBF output process, and a TS process are performed, as described in step S35 of FIG. 15, and then the process proceeds to step S76.

That is, in the sGSE process, the sGSE packet extraction unit 62 extracts the sGSE packet from the BBF on the assumption that the sGSE packet is included in the BBF from the BB header processing unit 61 and supplies the sGSE packet to the PDU extraction unit 63. The PDU extraction unit 63 extracts the PDU from the sGSE packet from the sGSE packet extraction unit 62 and outputs the PDU to the output unit 55.

In the BBF output process, the BBF output unit 64 outputs the BBF from the BB header processing unit 61 to the output unit 55.

In the TS process, the TS packet extraction unit 65 extracts the TS packet from the BBF on the assumption that the TS packet is included in the BBF from the BB header processing unit 61 and supplies the TS packet to the smoothing unit 66. The smoothing unit 66 performs the smoothing on the TS packet from the TS packet extraction unit 65 and outputs the TS packet to the output unit 55.

In step S76, the controller 92 performs the identification of the data field to identify the fact that the data field of the BBF supplied immediately previously from the FEC decoding unit 53 to the stream processing unit 54 is one of the sGSE packet, the TS packet, and the GSE packet based on the BB header (BB signaling) from the BB header processing unit 61 as the sGSE signaling, and then the process proceeds to step S77.

In step S77, the controller 92 controls the output unit 55 based on the identification result obtained by identifying the data field in step S76 such that the output unit 55 accordingly selects and outputs one of the outputs of the PDU extraction unit 63, the BBF output unit 64, and the smoothing unit 66, and then the reception process ends.

That is, the output unit 55 selects and outputs the PDU which is output by the PDU extraction unit 63 and can be obtained as the result of the sGSE process, the BBF which is output by the BBF output unit 64 and can be obtained as the result of the BBF output process, or the TS packet which is output by the smoothing unit 66 and can be obtained as the result of the TS process under the control of the controller 92.

The reception process in FIG. 22 is repeatedly performed with a pipeline.

In FIG. 22, the sGSE process, the BBF output process, and the TS process are all performed in step S75. Thereafter, in step S76, the identification of the data field is performed to identify the fact that the data field of the BBF is one of the sGSE packet, the TS packet, and the GSE packet based on the BB header as the sGSE signaling. However, the identification of the data field can be performed first and only one of the sGSE process, the BBF output process, and the TS process can be performed based on the identification result.

That is, when the fact that the data field of the BBF is the sGSE packet as the result of the identification of the data field is identified, only the sGSE process can be performed among the sGSE process, the BBF output process, and the TS process.

Likewise, when the fact that the data field of the BBF is the GSE packet is identified as the result of the identification of the data field, only the BBF output process can be performed. When the fact that the data field of the BBF is the TS packet is identified, only the TS process can be performed.

[Description of Computer to which the Present Technology is Applied]

Next, the above-described series of processes can be executed by hardware or can be executed by software. When the series of processes are executed by software, a program including the software is installed on a computer such as a microcomputer.

Figure 23:
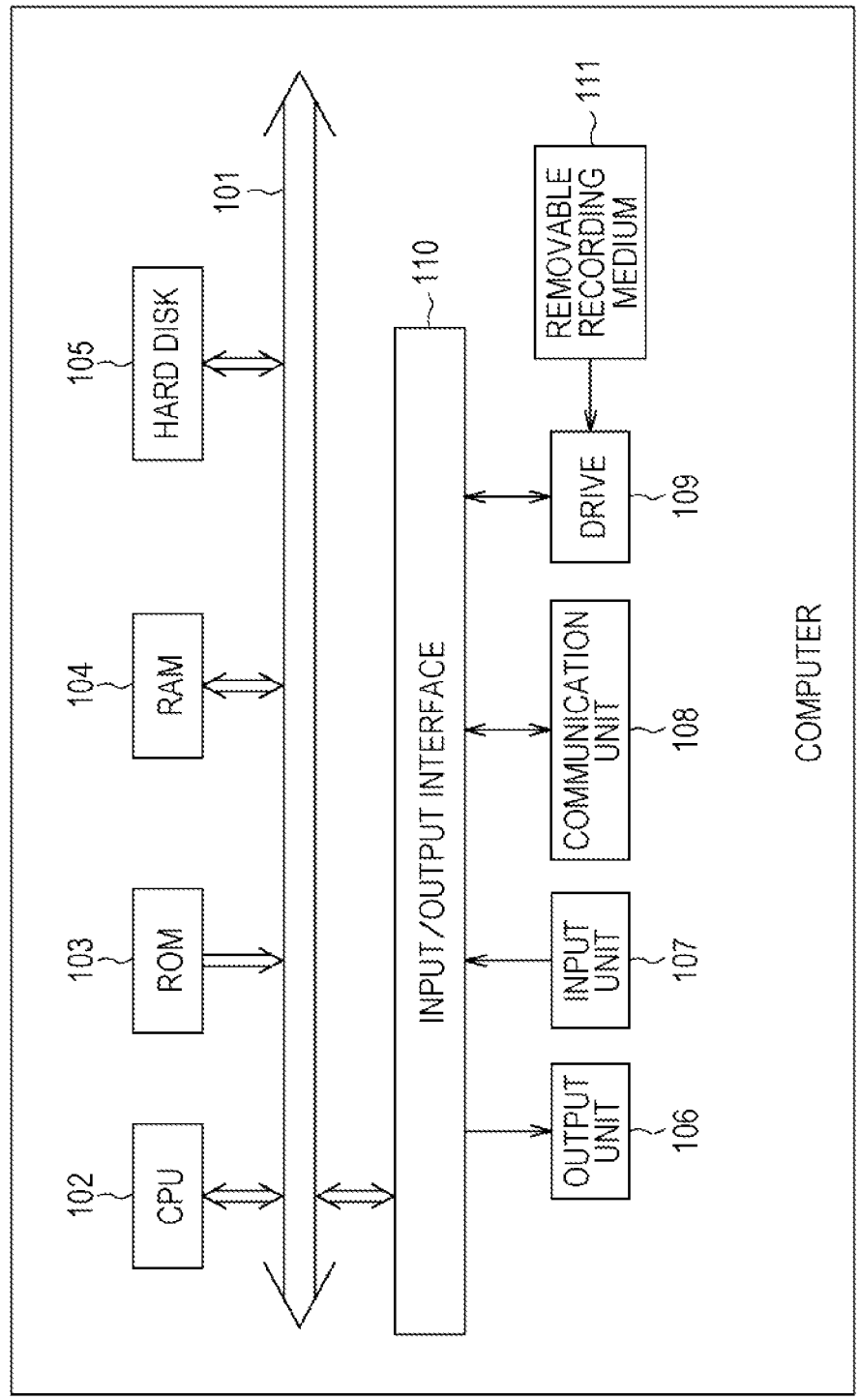
FIG. 23 is a block diagram illustrating an example of the configuration of a computer of an embodiment to which the present technology is applied.

FIG. 23 illustrates an example of the configuration of a computer on which the program executing the above-described series of processes is installed according to an embodiment.

The program can be recorded in advance in a hard disk 105 or a ROM 103 as a recording medium included in a computer.

Alternatively, the program can be stored (recorded) in a removable recording medium 111. The removable recording medium 111 can be provided as so-called package software. Here, examples of the removable recording medium 111 includes a flexible disk, a CD-ROM (Compact Disc Read Only Memory), an MO (Magneto Optical) disk, a DVD (Digital Versatile Disc), a magnetic disk, and a semiconductor memory.

Not only is the program installed on the computer from the above-described removable recording medium 111, but the program can also be downloaded to a computer via a communication network or a broadcast network and be installed on the included hard disk 105. That is, for example, the program can be transmitted wirelessly from a download site to the computer via a satellite for digital satellite broadcasting or can be transmitted in a wired manner from the download site to the computer via a network such as a LAN (Local Area Network) or the Internet.

The computer includes a CPU (Central Processing Unit) 102. An input/output interface 110 is connected to the CPU 102 via a bus 101.

When a user operates an input unit 107 and inputs a command via the input/output interface 110, the CPU 102 accordingly executes the program stored in the ROM (Read Only Memory) 103. Alternatively, the CPU 102 loads the program stored in the hard disk 105 to a RAM (Random Access Memory) 104 and executes the program.

In this way, the CPU 102 executes the processes of the above-described flowcharts or the processes performed by the configurations of the above-described block diagrams. Then, for example, the CPU 102 outputs the processing results from the output unit 106 or transmits the processing results from the communication unit 108 via the input/output interface 110, as necessary, and records the processing results on the hard disk 105.

The input unit 107 includes a keyboard, a mouse, or a microphone. The output unit 106 includes an LCD (Liquid Crystal Display) or a speaker.

Here, in the present specification, the processes executed by the computer according to the program may not necessarily be executed chronologically according to the orders described in the flowcharts. That is, the processes executed by the computer according to the program also include processes (for example, parallel processes or processes by an object) executed in parallel or individually.

The program may be processed by one computer (processor) or may be processed in a distributed manner by a plurality of computers.

Embodiments of the present technology are not limited to the above-described embodiments, but may be modified in various ways within the scope of the present technology without departing from the gist of the present technology.

That is, the present technology is also applicable when the sGSE packet is transmitted in conformity with, for example, DVB-NGH, ATSC (Advanced Television Systems Committee) 3.0, or others in addition to the DVB-T2, the DVB-C2, and the DVB-S2.

The present technology can be realized as follows.

<1>

A data processing device includes a packet structuring unit that sets, as a target, only a PDU (Protocol Data Unit) of which a maximum size is restricted to a predetermined restriction size equal to or less than 4096 bytes and structures an sGSE packet which is a GSE packet in which the PDU is deployed in a data field and which conforms to DVB (Digital Video Broadcasting)-GSE (Generic Stream Encapsulation).

<2>

In the data processing device described in <1>, the restriction size may be 1542 bytes, 1538 bytes, 1530 bytes, 1526 bytes, 1522 bytes, 1518 bytes, or 1500 bytes.

<3>

The data processing device described in <1> or <2> may further include a signaling generation unit that generates sGSE signaling which is signaling used to identify a fact that data is the sGSE packet in a layer equal to or lower than a data link layer of an OSI (Open Systems Interconnection) reference model. The sGSE packet may be transmitted together with the sGSE signaling.

<4>

The data processing device described in <3> may further include a BBF structuring unit that structures a BBF (Base Band Frame) in which BB (Base Band) signaling is deployed in a header and the sGSE packet is deployed in a data field. The signaling generation unit may generate the BB signaling including the sGSE signaling.

<5>

In the data processing device described in <4>, the BBF may be transmitted in conformity with DVB-T2 or DVB-C2. The signaling generation unit may use, for the sGSE signaling, a TS/GS field and an EXT field of MATYPE-1 included in the BB signaling of the DVB-T2 or the DVB-C2, or the TS/GS field and an NPD field of the MATYPE-1.

<6>

The data processing device described in <3> may further include a BBF structuring unit that structures a BBF (Base Band Frame) in which BB (Base Band) signaling is deployed in a header and the sGSE packet is deployed in a data field. The BBF may be transmitted in conformity with DVB-T2 or DVB-C2. The signaling generation unit may use, for the sGSE signaling, a PLP_PAYLOAD_TYPE field included in L1-post signaling of the DVB-T2 or the DVB-C2.

<7>

In the data processing device described in <4>, the BBF may be transmitted in conformity with DVB-S2. The signaling generation unit may use, for the sGSE signaling, a TS/GS field of MATYPE-1 included in the BB signaling of the DVB-S2, the TS/GS field of the MATYPE-1 and a SYNCD field included in the BB signaling of the DVB-S2, or the TS/GS field and an NPD field of the MATYPE-1.

<8>

A data processing method includes setting, as a target, only a PDU (Protocol Data Unit) of which a maximum size is restricted to a predetermined restriction size equal to or less than 4096 bytes and structuring an sGSE packet which is a GSE packet in which the PDU is deployed in a data field and which conforms to DVB (Digital Video Broadcasting)-GSE (Generic Stream Encapsulation).

<9>

A program causes a computer to function as a packet structuring unit that sets, as a target, only a PDU (Protocol Data Unit) of which a maximum size is restricted to a predetermined restriction size equal to or less than 4096 bytes and structures an sGSE packet which is a GSE packet in which the PDU is deployed in a data field and which conforms to DVB (Digital Video Broadcasting)-GSE (Generic Stream Encapsulation).

<10>

A data processing device includes: a reception unit that receives an sGSE packet which is a GSE packet which is structured by setting, as a target, only a PDU (Protocol Data Unit) of which a maximum size is restricted to a predetermined restriction size equal to or less than 4096 bytes, in which the PDU is deployed in a data field, and which conforms to DVB (Digital Video Broadcasting)-GSE (Generic Stream Encapsulation) and receives sGSE signaling which is signaling used to identify a fact that data is the sGSE packet in a layer equal to or lower than a data link layer of an OSI (Open Systems Interconnection) reference model; a PDU extraction unit that extracts the PDU from the sGSE packet; and an output unit that outputs the PDU extracted from the sGSE packet when the sGSE signaling indicates that the data is the sGSE packet.

<11>

In the data processing device described in <10>, the restriction size may be 1542 bytes, 1538 bytes, 1530 bytes, 1526 bytes, 1522 bytes, 1518 bytes, or 1500 bytes.

<12>

In the data processing device described in <11>, the reception unit may receive a BBF (Base Band Frame) in which BB (Base Band) signaling is deployed in a header and the sGSE packet, the GSE packet, or a TS (Transport Stream) packet is deployed in a data field. The BB signaling may include the sGSE signaling. The data processing device may further include an sGSE packet extraction unit that extracts the sGSE packet from the BBF.

<13>

In the data processing device described in <12>, the reception unit may receive the BBF transmitted in conformity with DVB-T2 or DVB-C2. The data processing device may further include a control unit that controls the output of the output unit by using a TS/GS field and an EXT field of MATYPE-1 included in the BB signaling of the DVB-T2 or the DVB-C2 or the TS/GS field and an NPD field of the MATYPE-1 as the sGSE signaling.

<14>

In the data processing device described in <11>, the reception unit may receive a BBF (Base Band Frame) in which BB (Base Band) signaling is deployed in a header and the sGSE packet, the GSE packet, or a TS (Transport Stream) packet is deployed in a data field and which is transmitted in conformity with DVB-T2 or DVB-C2. The data processing device may further include a control unit that controls the output of the output unit by using a PLP_PAYLOAD_TYPE field included in L1-post signaling of the DVB-T2 or the DVB-C2 as the sGSE signaling.

<15>

In the data processing device described in <12>, the reception unit may receive the BBF transmitted in conformity with DVB-S2. The data processing device may further include a control unit that controls the output of the output unit by using a TS/GS field of MATYPE-1 included in the BB signaling of the DVB-S2, the TS/GS field of the MATYPE-1 and a SYNCD field included in the BB signaling of the DVB-S2, or the TS/GS field and an NPD field of the MATYPE-1 as the sGSE signaling.

<16>

In the data processing device described in <10> or <11>, the reception unit may receive a BBF (Base Band Frame) in which BB (Base Band) signaling is deployed in a header and the sGSE packet, the GSE packet, or a TS (Transport Stream) packet is deployed in a data field and which is transmitted in conformity with DVB-T2, DVB-C2, or DVB-S2. The output unit may output the BBF without change when the sGSE signaling does not indicate that the data is the sGSE packet and a TS/GS field of MATYPE-1 included in BB signaling of the DVB-T2, the DVB-C2, or the DVB-S2 or a PLP_PAYLOAD_TYPE field included in L1-post signaling of the DVB-T2 or the DVB-C2 indicates that the data is the GSE packet.

<17>

A data processing method includes: a reception step of receiving an sGSE packet which is a GSE packet which is structured by setting, as a target, only a PDU (Protocol Data Unit) of which a maximum size is restricted to a predetermined restriction size equal to or less than 4096 bytes, in which the PDU is deployed in a data field, and which conforms to DVB (Digital Video Broadcasting)-GSE (Generic Stream Encapsulation) and receiving sGSE signaling which is signaling used to identify a fact that data is the sGSE packet in a layer equal to or lower than a data link layer of an OSI (Open Systems Interconnection) reference model; an extraction step of extracting the PDU from the sGSE packet; and an output step of outputting the PDU extracted from the sGSE packet when the sGSE signaling indicates that the data is the sGSE packet.

<18>

A program causes a computer to function as: a reception unit that receives an sGSE packet which is a GSE packet which is structured by setting, as a target, only a PDU (Protocol Data Unit) of which a maximum size is restricted to a predetermined restriction size equal to or less than 4096 bytes, in which the PDU is deployed in a data field, and which conforms to DVB (Digital Video Broadcasting)-GSE (Generic Stream Encapsulation) and receives sGSE signaling which is signaling used to identify a fact that data is the sGSE packet in a layer equal to or lower than a data link layer of an OSI (Open Systems Interconnection) reference model; a PDU extraction unit that extracts the PDU from the sGSE packet; and an output unit that outputs the PDU extracted from the sGSE packet when the sGSE signaling indicates that the data is the sGSE packet.

REFERENCE SIGNS LIST

21 Demodulation LSI
31 Controller
32 Signaling generation unit
$33_1$, $33_2$, $33_3$ Data structuring unit
34 Framing unit
35 OFDM demodulation unit
41 Inspection unit
42 sGSE packet structuring unit
43 BBF structuring unit
44 FEC coding unit
45 GSE packet structuring unit
46 BBF structuring unit
47 FEC coding unit
48 BBF structuring unit
49 FEC coding unit
51 OFDM demodulation unit
52 Frame processing unit
53 FEC decoding unit
54 Stream processing unit
55 Output unit
56 Controller
61 BB header processing unit
62 sGSE packet extraction unit
63 PDU extraction unit
64 BBF output unit
65 TS packet extraction unit
66 Smoothing unit
$71_1$, $71_2$ Data structuring unit
72 Merging/slicing unit
73 Signaling generation unit
74 BBF structuring unit
75 FEC coding unit 76 PL framing unit
91 Frame processing unit
92 Controller
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. A data processing device comprising:
  circuitry configured to:
    receive a digital video broadcast signal including:
      a first physical layer pipe (PLP) and a second PLP, wherein the first PLP includes a general stream encapsulation (GSE) packet and the second PLP includes a simplified GSE packet having a data field containing a protocol data unit (PDU) of which a maximum size is restricted to a predetermined restriction size equal to or less than 4096 bytes such that the maximum size of any PDU carried by the simplified GSE packet is 4096 bytes and any PDU carried by the simplified GSE packet is carried by the simplified GSE packet without being fragmented, and
      signaling indicating that the first PLP includes the GSE packet and that the second PLP includes the simplified GSE packet, the signaling being in an open systems interconnection (OSI) data link layer or in a lower OSI layer; and
    extract the PDU from the simplified GSE packet if the signaling indicates that second PLP includes the simplified GSE packet.

2. The data processing device according to claim 1, wherein the restriction size is 1542 bytes, 1538 bytes, 1530 bytes, 1526 bytes, 1522 bytes, 1518 bytes, or 1500 bytes.

3. The data processing device according to claim 1, wherein the circuitry is configured to receive a BBF (Base Band Frame) in which BB (Base Band) signaling is deployed in a header and the simplified GSE packet, the GSE packet, or a TS (Transport Stream) packet is deployed in a data field,
  wherein the BB signaling includes the signaling, and
  wherein the circuitry is configured to extract the simplified GSE packet from the BBF.

4. The data processing device according to claim 3,
  wherein the circuitry is configured to receive the BBF transmitted in conformity with DVB-T2 or DVB-C2, and
  wherein the circuitry is configured to control the output by using a Transport Stream/Generic Stream (TS/GS) field and an EXT field of MATYPE-1 included in the BB signaling of the DVB-T2 or the DVB-C2 or the TS/GS field and an NPD field of the MATYPE-1 as the signaling.

5. The data processing device according to claim 3,
  wherein the circuitry is configured to receive the BBF transmitted in conformity with DVB-S2, and
  wherein the circuitry is configured to control the output by using a Transport Stream/Generic Stream (TS/GS) field of MATYPE-1 included in the BB signaling of the DVB-S2, the TS/GS field of the MATYPE-1 and a SYNCD field included in the BB signaling of the DVB-S2, or the TS/GS field and an NPD field of the MATYPE-1 as the signaling.

6. The data processing device according to claim 1,
  wherein the circuitry is configured to receive a BBF (Base Band Frame) in which BB (Base Band) signaling is deployed in a header and the simplified GSE packet, the GSE packet, or a TS (Transport Stream) packet is deployed in a data field and which is transmitted in conformity with DVB-T2 or DVB-C2, and
  wherein the circuitry is configured to control the output by using a Physical Layer Pipe Payload Type (PLP_PAYLOAD_TYPE) field included in L1-post signaling of the DVB-T2 or the DVB-C2 as the signaling.

7. The data processing device according to claim 1,
  wherein the circuitry is configured to receive a BBF (Base Band Frame) in which BB (Base Band) signaling is deployed in a header and the simplified GSE packet, the GSE packet, or a TS (Transport Stream) packet is deployed in a data field and which is transmitted in conformity with DVB-T2, DVB-C2, or DVB-S2, and
  wherein the circuitry is configured to output the BBF without change when the sGSE signaling does not indicate that the data is the simplified GSE packet and a Transport Stream/Generic Stream (TS/GS) field of MATYPE-1 included in BB signaling of the DVB-T2, the DVB-C2, or the DVB-S2 or a Physical Layer Pipe Payload Type (PLP_PAYLOAD_TYPE) field included in L1-post signaling of the DVB-T2 or the DVB-C2 indicates that the data is the GSE packet.

8. A digital television receiver comprising the data processing device according to claim 1.

9. A data processing method comprising:
  receiving a digital video broadcast signal including:
    a first physical layer pipe (PLP) and a second PLP, wherein the first PLP includes a general stream encapsulation (GSE) packet and the second PLP includes a simplified GSE packet having a data field containing a protocol data unit (PDU) of which a maximum size is restricted to a predetermined restriction size equal to or less than 4096 bytes such that the maximum size of any PDU carried by the simplified GSE packet is 4096 bytes and any PDU carried by the simplified GSE packet is carried by the simplified GSE packet without being fragmented, and
    signaling indicating that the first PLP includes the GSE packet and that the second PLP includes the simplified GSE packet, the signaling being in an open systems interconnection (OSI) data link layer or in a lower OSI layer; and
  extracting the PDU from the simplified GSE packet if the signaling indicates that second PLP includes the simplified GSE packet.

10. A non-transitory storage medium configured to store a program causing a computer to function as:
  a reception unit that receives a digital video broadcast signal including:
    a first physical layer pipe (PLP) and a second PLP, wherein the first PLP includes a general stream encapsulation (GSE) packet and the second PLP includes a simplified GSE packet having a data field containing a protocol data unit (PDU) of which a maximum size is restricted to a predetermined restriction size equal to or less than 4096 bytes such that the maximum size of any PDU carried by the simplified GSE packet is 4096 bytes and any PDU carried by the simplified GSE packet is carried by the simplified GSE packet without being fragmented, and signaling indicating that the first PLP includes the GSE packet and that the second PLP includes the simplified GSE packet, the signaling being in an open systems interconnection (OSI) data link layer or in a lower OSI layer; and a PDU extraction unit that extracts the PDU from the simplified GSE packet if the signaling indicates that second PLP includes the simplified GSE packet.

* * * * *